US010523928B2

(12) United States Patent
Hwang et al.

(10) Patent No.: US 10,523,928 B2
(45) Date of Patent: Dec. 31, 2019

(54) METHOD AND APPARATUS FOR CORRECTING DISTORTION

(71) Applicant: SAMSUNG ELECTRONICS CO., LTD., Suwon-si (KR)

(72) Inventors: Hyoseok Hwang, Suwon-si (KR); Dong kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 15/644,215

(22) Filed: Jul. 7, 2017

(65) Prior Publication Data

US 2018/0139437 A1 May 17, 2018

(30) Foreign Application Priority Data

Nov. 16, 2016 (KR) ........................ 10-2016-0152787

(51) Int. Cl.
| | |
|---|---|
| *H04N 13/327* | (2018.01) |
| *H04N 13/383* | (2018.01) |
| *H04N 13/324* | (2018.01) |
| *H04N 13/128* | (2018.01) |
| *H04N 13/31* | (2018.01) |
| *H04N 13/398* | (2018.01) |

(Continued)

(52) U.S. Cl.
CPC ......... *H04N 13/327* (2018.05); *H04N 13/128* (2018.05); *H04N 13/31* (2018.05); *H04N 13/317* (2018.05); *H04N 13/324* (2018.05); *H04N 13/351* (2018.05); *H04N 13/383* (2018.05); *H04N 13/398* (2018.05)

(58) Field of Classification Search
CPC .. H04N 13/327; H04N 13/317; H04N 13/351; H04N 13/383; H04N 13/31; H04N 13/324; H04N 13/128; H04N 13/398
See application file for complete search history.

(56) References Cited

U.S. PATENT DOCUMENTS

2012/0038632 A1\* 2/2012 Matsunaga ........ G02B 27/2214
345/419
2014/0293018 A1 10/2014 Pasquier et al.
(Continued)

FOREIGN PATENT DOCUMENTS

| JP | 2007-288295 A | 11/2007 |
| JP | 2013-102434 A | 5/2013 |

(Continued)

OTHER PUBLICATIONS

Weiming Li et al; "Principal Observation Ray Calibration for Tiled-Lens-Array Integral Imaging Display"; 2013 IEEE Conference on Computer Vision and Pattern Recognition; pp. 1019-1026; 8 pgs. total.

(Continued)

*Primary Examiner* — Nam D Pham
(74) *Attorney, Agent, or Firm* — Sughrue Mion, PLLC

(57) ABSTRACT

A method and apparatus for correcting a distortion are provided. The distortion correction method includes displaying a first image on a display panel based on source images that correspond to respective viewpoints of the display panel, generating a second image by capturing the display panel at a first point, and determining a first compensation value to be used to compensate for a distortion of the second image with respect to the display panel.

14 Claims, 19 Drawing Sheets

(51) Int. Cl.
*H04N 13/317* (2018.01)
*H04N 13/351* (2018.01)

(56) References Cited

U.S. PATENT DOCUMENTS

2015/0085087 A1 3/2015 Vienne et al.
2016/0021367 A1 1/2016 Yoon et al.

FOREIGN PATENT DOCUMENTS

| JP | 2013-190713 A | 9/2013 |
| KR | 10-2007-0055882 A | 5/2007 |
| KR | 10-2014-0115032 A | 9/2014 |
| KR | 10-2016-0040779 A | 4/2016 |
| KR | 10-2016-0061827 A | 6/2016 |

OTHER PUBLICATIONS

Ahn HA-EUN et al; "Correction of geometric distortion using optimized Bezier control points"; Jun. 25, 2014; 3 pgs. total.

\* cited by examiner

FIG. 11
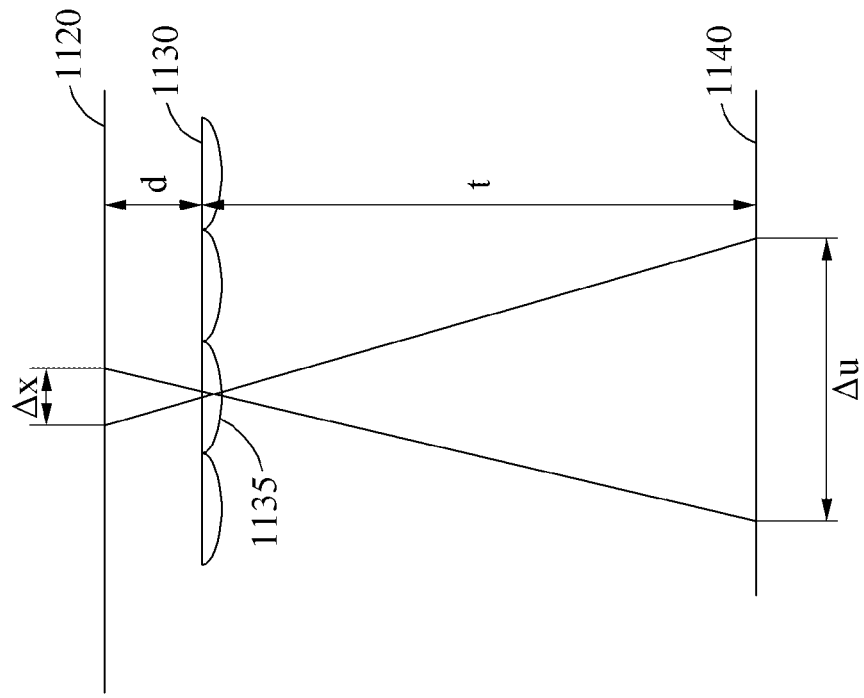
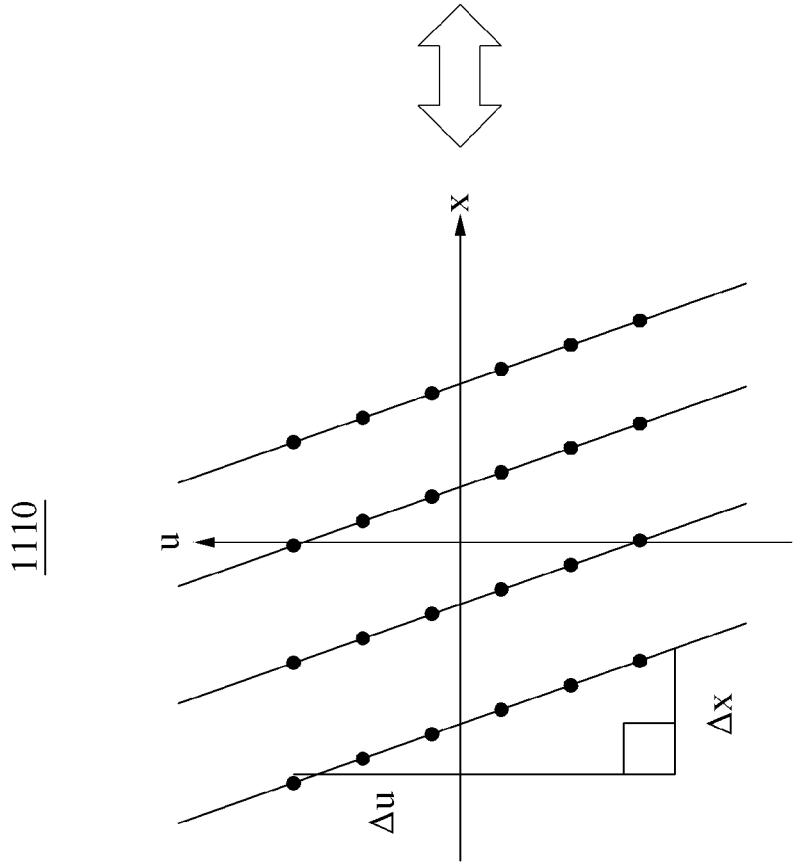

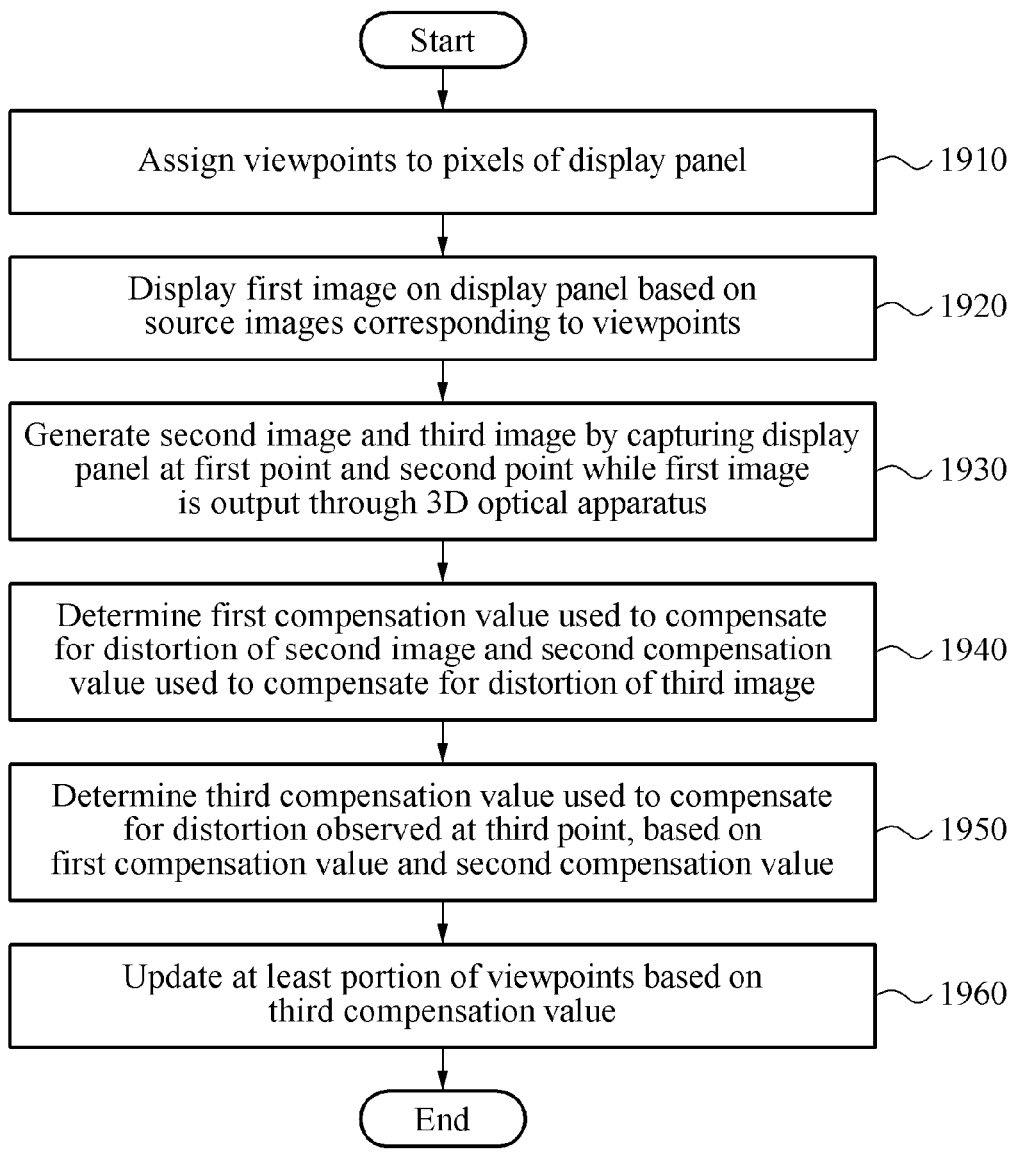

METHOD AND APPARATUS FOR CORRECTING DISTORTION

CROSS-REFERENCE TO RELATED APPLICATION

This application claims priority from Korean Patent Application No. 10-2016-0152787, filed on Nov. 16, 2016, in the Korean Intellectual Property Office, the disclosure of which is incorporated herein by reference in its entirety.

BACKGROUND

1. Field

Methods and apparatuses consistent with exemplary embodiments relate to a distortion correction method of a three-dimensional (3D) imaging apparatus and an apparatus that implements the distortion correction method.

2. Description of the Related Art

The most dominant factor for recognizing stereoscopic images is a difference between images shown to both eyes of a user. A scheme of displaying different images to both eyes of a user includes, for example, a glasses scheme of filtering a desired image by a division using polarized light, a time division or a wavelength division using different wavelengths of a primary color, and a glasses-free scheme of enabling each image to be viewed in a predetermined space by using a three-dimensional (3D) conversion apparatus, for example, a parallax barrier, a lenticular lens or a directional backlight unit (BLU). The glasses-free scheme may reduce an inconvenience of wearing glasses. However, when an error which is different from a design value occurs in a production process of a 3D display apparatus or a process of installing a 3D conversion apparatus, an image quality may be degraded due to crosstalk.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a distortion correction method including assigning viewpoints to pixels of a display panel, displaying a first image on the display panel based on source images that correspond to the viewpoints, generating a second image based on an image acquired by capturing the display panel at a first point while the first image is output via a three-dimensional (3D) optical apparatus, determining a first compensation value that is usable to compensate for a distortion of the second image due to a geometric distortion between the display panel and the 3D optical apparatus, and updating at least one of the viewpoints based on the first compensation value.

The determining of the first compensation value may include determining the first compensation value based on a difference between the second image and a source image that corresponds to a viewpoint of the first point. The distortion correction method may further include determining a reference source image observed at a reference point in the second image. The determining of the first compensation value may include determining the first compensation value so that the reference source image is displayed on an entire area of the second image. The source images may have respective feature values that correspond to viewpoint numbers. The determining of the first compensation value may include determining the first compensation value based on a difference between a feature value of the reference source image and at least one feature value of the other source images. The source images may have respective feature values determined based on hue values that are at regular intervals or intensity values that are at regular intervals.

The distortion correction method may further include determining a second compensation value based on a third image generated by capturing the display panel at a second point, the second compensation value being usable to compensate for a distortion of the third image, and determining a third compensation value based on the first compensation value and the second compensation value, the third compensation value being usable to compensate for a distortion observed at a third point. The updating of at least one of the viewpoints may include updating at least one of the viewpoints based on the third compensation value. The third compensation value may be determined based on a distance between the first point and the second point and a difference between the first compensation value and the second compensation value. The distortion correction method may further include detecting an eye position of a user of the display panel, and determining the third point based on the detected eye position.

The distortion correction method may further include determining respective fields of view (FOVs) for each of the pixels based on a geometric model of the 3D optical apparatus, determining respective angles formed by the first point, each of the pixels and a fourth point that is different from the first point, determining an adjustment value based on the FOVs and the angles, the adjustment value being usable to compensate for a distortion observed at the fourth point, and updating at least one of the viewpoints based on the adjustment value. The geometric model may be determined based on a gap between the display panel and the 3D optical apparatus, and the gap may be estimated based on the first compensation value. The adjustment value may be determined based on a ratio between the FOVs and the angles.

According to another aspect of an exemplary embodiment, there is provided a distortion correction method including assigning viewpoints to pixels of a display panel, displaying a first image on the display panel based on source images that correspond to the viewpoints, generating a second image and a third image based on respective images acquired by capturing the display panel at a first point and a second point while the first image is output via a 3D optical apparatus, determining a first compensation value that is usable to compensate for a distortion of the second image and a second compensation value that is usable to compensate for a distortion of the third image, determining a third compensation value based on the first compensation value and the second compensation value, the third compensation value being usable to compensate for a distortion observed at a third point, and updating at least one of the viewpoints based on the third compensation value.

According to another aspect of an exemplary embodiment, there is provided a distortion correction method including assigning viewpoints to pixels of a display panel, displaying a first image on the display panel based on source images that correspond to the viewpoints, generating second images based on respective images acquired by capturing the display panel at corresponding capturing points while the first image is output via a 3D optical apparatus, determining, based on the generated second images, visible pixel lines associated with visible pixels of the display panel observed at the capturing points, determining intersection points between the visible pixel lines and a line that corresponds to a viewing position, and reassigning a viewpoint that corresponds to the viewing position to pixels that corresponds to the determined intersection points among the pixels of the display panel.

The determining of the visible pixel lines may include determining corresponding points for the visible pixels based on respective pixel values of the generated second images, the corresponding points representing respective positions of the visible pixels based on the capturing points, and determining the visible pixel lines by connecting the determined corresponding points. The source images may have respective feature values that correspond to viewpoint numbers. The determining of the corresponding points may include determining a pixel of the display panel that corresponds to a first pixel included in the first image as a visible pixel, based on a comparison between a feature value of the first pixel and a feature value of a second pixel that corresponds to the first pixel among pixels included in the generated second images, and determining a corresponding point for the visible pixel based on the feature value of the second pixel.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which:

FIG. 11 is a diagram illustrating a relationship between a gap and visible pixel lines, according to an exemplary embodiment;

FIG. 19 is a flowchart illustrating another example of a distortion correction method, according to an exemplary embodiment.

DETAILED DESCRIPTION

Figure 1:
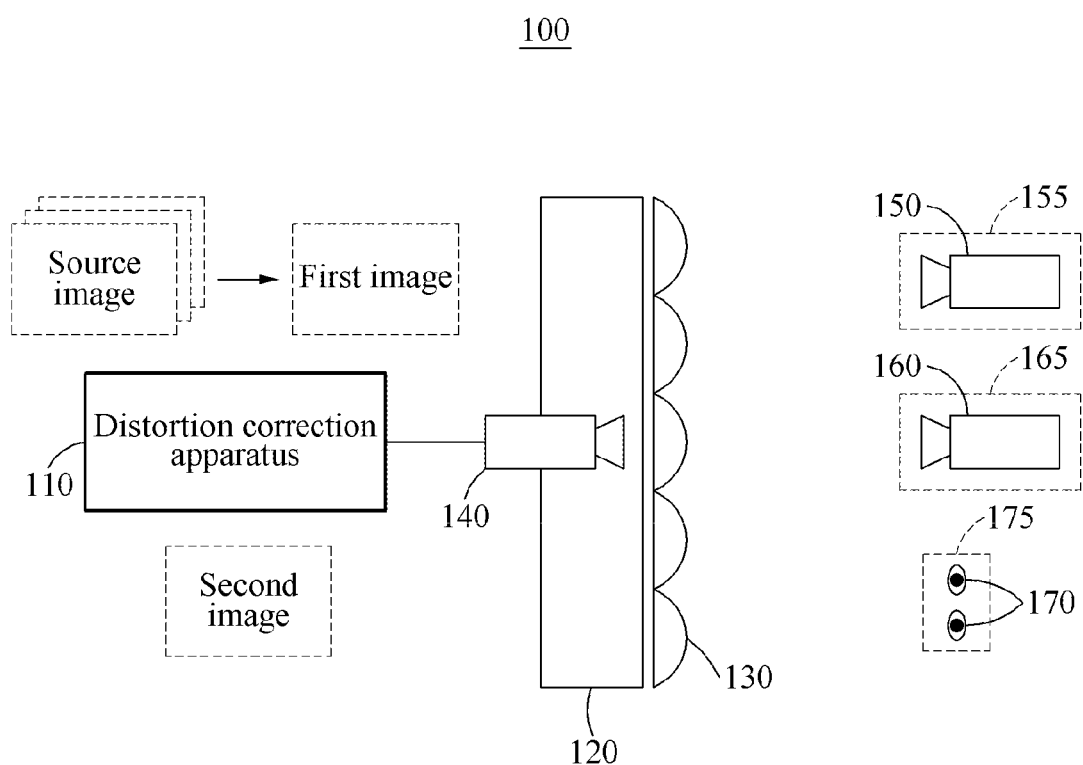
FIG. 1 is a diagram illustrating a distortion correction system, according to an exemplary embodiment.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, exemplary embodiments will be described in detail with reference to the accompanying drawings, and like reference numerals in the drawings refer to like elements throughout.

FIG. 1 is a diagram illustrating a distortion correction system 100, according to an exemplary embodiment. Referring to FIG. 1, the distortion correction system 100 includes a distortion correction apparatus 110, a display panel 120, a three-dimensional (3D) optical apparatus 130 and cameras 140, 150 and 160. The display panel 120 and the 3D optical apparatus 130 may jointly constitute a glasses-free three-dimensional (3D) display apparatus. The glasses-free 3D display apparatus may be used to enable a user to view a 3D image even though the user does not wear an additional device, such as, for example, glasses. Light output from each of pixels included in a display panel of a two-dimensional (2D) display apparatus may propagate in all directions, whereas light may be output from each of pixels included in the display panel 120 of the glasses-free 3D display apparatus in a direction that is limited by the 3D optical apparatus 130. Accordingly, different respective images may be incident on both eyes of a user, and the user may feel a 3D effect.

In the glasses-free 3D display apparatus, the 3D optical apparatus 130 may be attached onto a front surface or a rear surface of a panel. The 3D optical apparatus 130 may control a traveling direction of light that propagates through a panel. The display panel 120 may include, for example, a liquid crystal display (LCD) panel, a light emitting diode (LED) panel, or an organic light emitting diode (OLED) panel. The 3D optical apparatus 130 may include, for example, a lens array, a parallax barrier, or a directional backlight unit (BLU). For example, pixels of the display panel 120 may output light in all directions. When the 3D optical apparatus 130 is a lens array, light may be refracted by the lens array and may be output in a predetermined direction only. When the 3D optical apparatus 130 is a parallax barrier, light that propagates in a predetermined direction may be allowed to pass through the parallax barrier, and light that propagates in the other directions may be blocked.

In a process of manufacturing the 3D optical apparatus 130, the 3D optical apparatus 130 may have parameters other than a predesigned parameter. Parameters may include, for example, a pitch that indicates a periodicity of a lens or a barrier, a slanted angle that indicates a degree to which a lens or a barrier is inclined, a gap that indicates a distance between the display panel 120 and a lens or a barrier, and an offset that indicates an x-axis relationship between the display panel 120 and a lens or a barrier. When a 3D image is output based on a predesigned parameter instead of parameters of the 3D optical apparatus 130 that is actually manufactured, crosstalk may occur, or the 3D image may be distorted. When the crosstalk occurs, a user may view a blurred image or a distorted image that causes dizziness when a severe error occurs.

To prevent the crosstalk, a scheme of estimating a parameter for actual viewing and of generating a 3D image based on the estimated parameter may be used. To estimate the parameter, a 3D optical apparatus may need to be defined by the parameter. A parameter estimation scheme may be applicable to a structure that may be represented by parameters. Accordingly, it may be difficult to apply the parameter estimation scheme to a 3D optical apparatus that is partially bent or partially distorted, or that has a shape that makes it difficult to perform a polynomial approximation. Further, because estimating of a parameter in the parameter estimation scheme is dependent on parameters, a 3D optical apparatus with a shape that may not be represented by parameters may not be corrected using the parameter estimation scheme.

To correct a distortion, the distortion correction apparatus 110 may directly assign compensation values for all pixels, instead of approximating a geometric shape by using parameters. Accordingly, a distortion of a 3D optical apparatus that is partially bent or distorted or that has an atypical shape may be corrected. For example, the distortion correction apparatus 110 may assign viewpoints to pixels of the display panel 120 based on a predetermined rule, and may display a first image on the display panel 120 based on respective source images that correspond to the viewpoints. The distortion correction apparatus 110 may output the first image via the 3D optical apparatus 130 by providing light to the display panel 120. The camera 160 may capture the display panel 120 at a first point 165 while the first image is output via the 3D optical apparatus 130. The capturing of the display panel 120 may include capturing the glasses-free 3D display apparatus which includes the display panel 120 and the 3D optical apparatus 130. The distortion correction apparatus 110 may generate a second image based on an image acquired by the camera 160. The second image may be an image that is converted to correspond to the first image, and the distortion correction apparatus 110 may cut or rotate the image acquired by the camera 160, in order to generate the second image.

The display panel 120 or the 3D optical apparatus 130 may be partially bent or partially distorted. Based on the above shape, a geometric distortion may occur between the display panel 120 and the 3D optical apparatus 130, and the second image may include a distortion by the display panel 120 and the 3D optical apparatus 130. The distortion correction apparatus 110 may determine a compensation value that is usable to compensate for a distortion of the second image. For example, the distortion correction apparatus 110 may determine a compensation value based on a difference between the second image and a source image that corresponds to a viewpoint of the first point 165. A process of determining a compensation value will be further described below. The distortion correction apparatus 110 may compensate for the distortion of the second image based on the determined compensation value by updating at least one or several of the viewpoints assigned to the pixels.

The compensation value determined based on the first point 165 may be limited in correction of a distortion observed at a third point 175. In an example, in order to correct the distortion observed at the third point 175, an additional compensation value based on the camera 150 may be used. Similarly to the camera 160, the camera 150 may capture the display panel 120 at a second point 155 while the first image is output via the 3D optical apparatus 130. The distortion correction apparatus 110 may generate a third image based on the image acquired by the camera 160, and may determine a compensation value that is usable to compensate for a distortion of the third image. The distortion correction apparatus 110 may estimate a compensation value of the third point 175 based on the compensation values that correspond to the first point 165 and the second point 155. The estimated compensation value may be used to correct a distortion observed by a user located at the third point 175. The distortion correction apparatus 110 may store the compensation values that correspond to the first point 165 and the second point 155 in a manufacturing process, and may estimate a compensation value based on a position of a user based on the compensation values that correspond to the first point 165 and the second point 155 in an actual use process. The distortion correction apparatus 110 may track a position of a user that is using the camera 140.

In another example, an adjustment value may be used to correct a distortion observed by a user at the third point 175. The distortion correction apparatus 110 may determine a geometric model of the 3D optical apparatus 130 based on a compensation value, and may determine an adjustment value for the third point 175 based on the geometric model. In this example, the compensation value may be determined based on an image acquired by a single camera, for example, the camera 160. The distortion correction apparatus 110 may estimate a gap between the display panel 120 and the 3D optical apparatus 130 based on the compensation value, and may determine the geometric model based on the estimated gap. A process of determining an adjustment value will be further described below. The distortion correction apparatus 110 may determine a compensation value based on an image captured at a point, for example, the first point 165, and may determine the geometric model based on the compensation value, in order to acquire an adjustment value for another point, for example, the third point 175.

The 3D optical apparatus 130 may have an atypical shape, for example, a curve, that may not be represented by parameters. Because a compensation value is determined independently of a parameter of the 3D optical apparatus 130, the distortion correction apparatus 110 may compensate for a distortion of the 3D optical apparatus 130 based on the compensation value regardless of a shape of the 3D optical apparatus 130. For example, when the 3D optical apparatus 130 is partially bent or partially distorted, and when the 3D optical apparatus 130 has a shape that makes it difficult to perform a polynomial approximation, for example, a front glass of a vehicle or a lens of glasses, the distortion correction apparatus 110 may compensate for the distortion of the 3D optical apparatus 130.

The distortion correction apparatus 110 may generate an image with a corrected distortion by assigning viewpoint numbers to all the pixels of the display panel 120 based on Equation 1 shown below.

$$v_{ij} = v_{ij}^a + v_{ij}^c + v_{ij}^w \quad \text{[Equation 1]}$$

In Equation 1, $v_{ij}$ denotes a viewpoint number of a pixel that corresponds to an i-th row and j-th column, $v_{ij}^a$ denotes an initial viewpoint number of the pixel that corresponds to the i-th row and j-th column, $v_{ij}^c$ denotes a compensation value for the pixel that corresponds to the i-th row and j-th column, and $v_{ij}^w$ denotes an adjustment value for the pixel that corresponds to the i-th row and j-th column. The compensation value $v_{ij}^c$ may be associated with a fixed point, for example, the first point 165, and may be used for a user who observes an image at the fixed point. In addition, compensation values determined for a plurality of points, for example, the first point 165 and the second point 155, may be used to determine a compensation value for another point, for example, the third point 175. To determine the compensation value for the other point, the adjustment value $v_{ij}^w$ may be additionally used.

Figure 2:
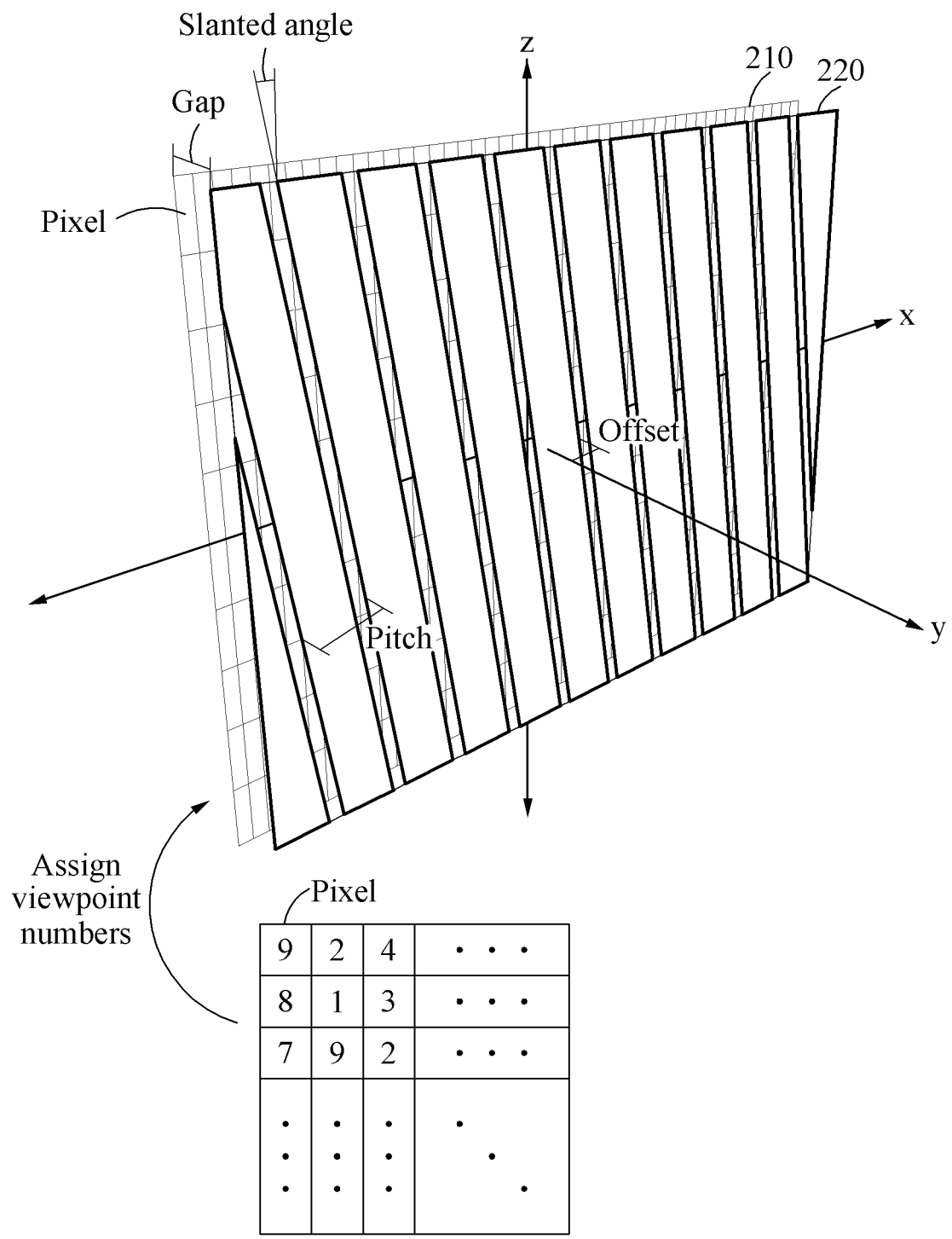
FIG. 2 is a diagram illustrating assignment of viewpoints, according to an exemplary embodiment.

FIG. 2 is a diagram illustrating assignment of viewpoints, according to an exemplary embodiment. FIG. 2 illustrates a display panel 210 and a 3D optical apparatus 220. The display panel 210 may include a plurality of pixels, and various parameters associated with the 3D optical apparatus 220 or a relationship between the display panel 210 and the 3D optical apparatus 220 may be defined. Parameters may include, for example, a pitch that indicates a periodicity of a lens or a barrier, a slanted angle that indicates a degree to which a lens or a barrier is inclined, a gap that indicates a distance between a display panel and a lens or a barrier, and an offset that indicates an x-axis relationship between a display panel and a lens or a barrier.

A distortion correction apparatus may assign initial viewpoint numbers to all the pixels of the display panel 210. For example, the distortion correction apparatus may assign the initial viewpoint numbers by using Equation 2 shown below.

$$v_{ij}^a = N \times \mathrm{mod}\left(\frac{j - f - i\tan\alpha}{p\cos\alpha}\frac{d-t}{d}, p\cos\alpha\frac{d}{d-t}\right) \quad \text{[Equation 2]}$$

In Equation 2, $v_{ij}^a$ denotes an initial viewpoint number of a pixel that corresponds to an i-th row and j-th column, N denotes a total number of viewpoints, i denotes a row of a pixel, and j denotes a column of a pixel. Also, f denotes an offset, α denotes a slanted angle, p denotes a pitch, d denotes a distance between the display panel 210 and a camera, and t denotes a gap.

Figure 3:
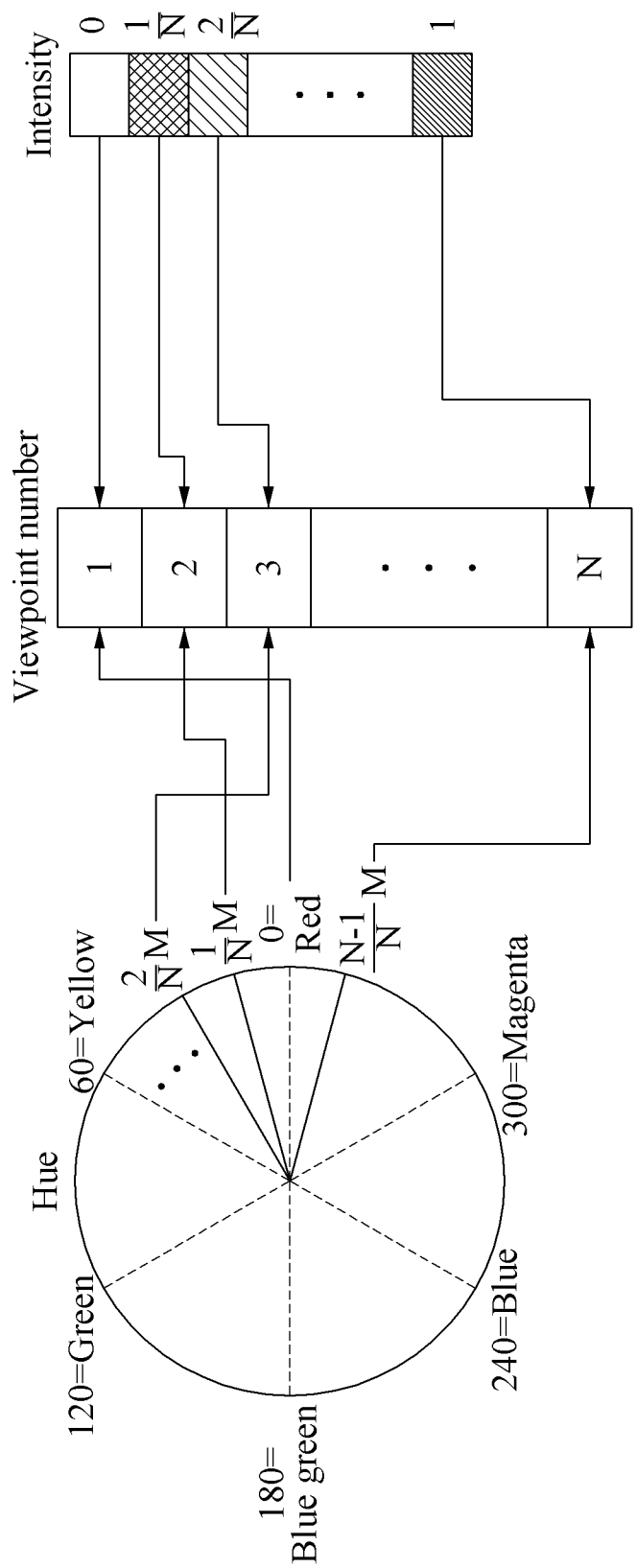
FIG. 3 is a diagram illustrating feature values, according to an exemplary embodiment.

FIG. 3 is a diagram illustrating feature values, according to an exemplary embodiment. In a distortion correction process, feature values may be used. A distortion correction apparatus may assign feature values to viewpoint numbers, and may calculate a compensation value or an adjustment value based on the feature values. As described above, a first image may be generated based on source images. The first image may have a plurality of viewpoints, and different source images may be applied for each of the viewpoints of the first image. The source images may have different feature values based on viewpoints. The feature values may be determined based on hue values that are at regular intervals, and/or based on intensity values that are at regular intervals. An intensity may refer to an intensity of light. Based on the first image generated based on the source images with the feature values, a distortion may be intuitively observed and easily corrected. In the following description, a hue value will be described as an example, however, there is not limitation thereto. Accordingly, the following description may also be applicable to an intensity and another example.

The distortion correction apparatus may divide the feature values based on the total number N of viewpoints, so that the feature values assigned to the viewpoint numbers may be at regular intervals. For example, when a range M of hue values is set to "360" and the total number N of viewpoints is set to "10," a hue value of "0" may be assigned to a first viewpoint, a hue value of "36" may be assigned to a second viewpoint, and a hue value of "324" may be assigned to a tenth viewpoint. In this example, a red image that corresponds to the hue value of "0" may need to be observed at a point that corresponds to the first viewpoint. When an image that includes another color is observed at the point that corresponds to the first viewpoint, the image may include a distortion, and accordingly the distortion may be corrected by the hue value. Because the feature values are assigned to the viewpoints at regular intervals, a linear transformation between the viewpoints may be performed based on the feature values. Accordingly, a compensation value or an adjustment value may be easily calculated based on a linear transformation between the viewpoints, which will be further described below.

Figure 4:
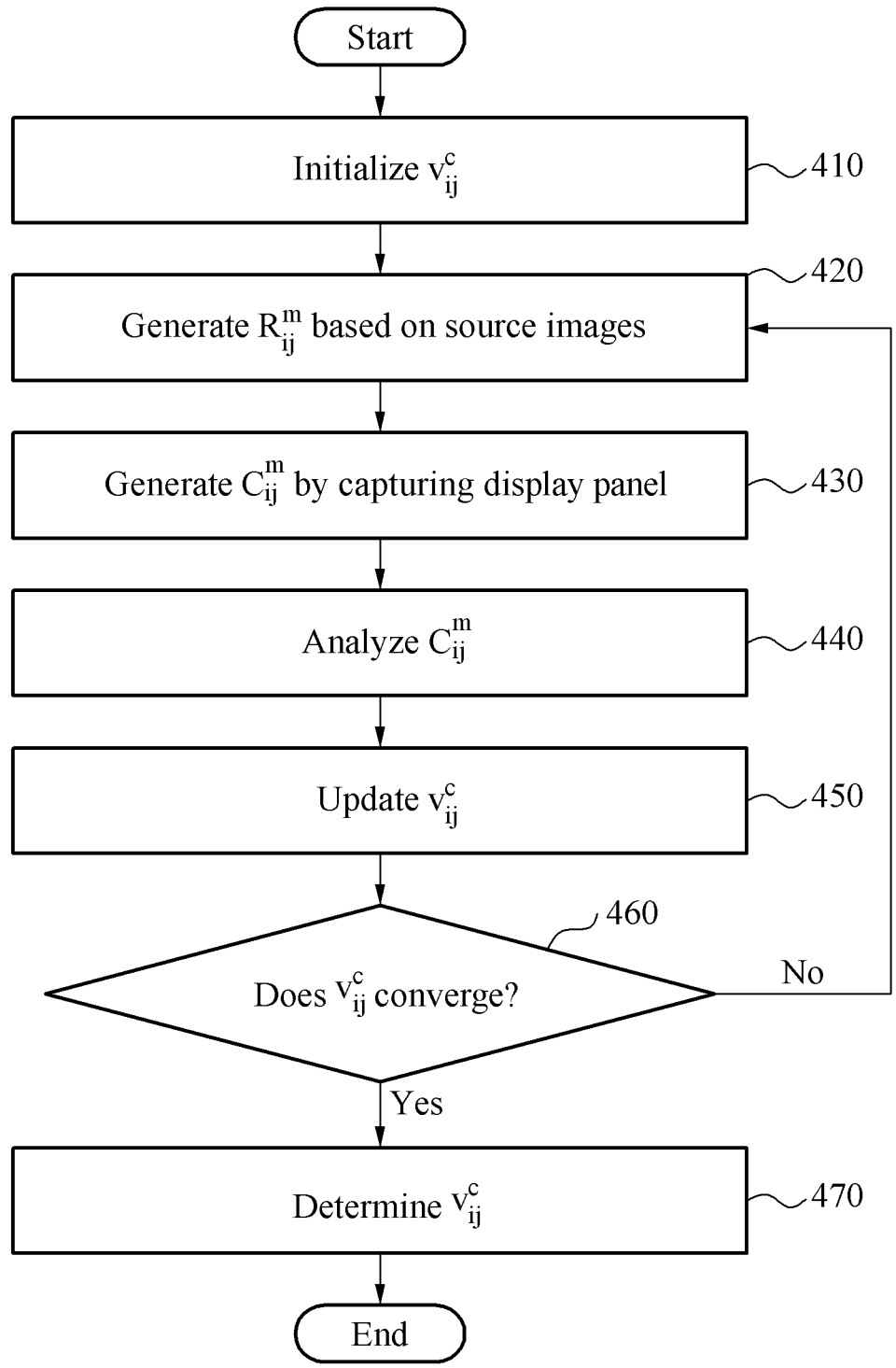
FIG. 4 is a flowchart illustrating a process of determining a compensation value, according to an exemplary embodiment.

FIG. 4 is a flowchart illustrating a process of determining a compensation value, according to an exemplary embodiment. Referring to FIG. 4, in operation 410, a distortion correction apparatus initializes a compensation value $v_{ij}^c$. The distortion correction apparatus may initialize the compensation value $v_{ij}^c$ to zero. In operation 420, the distortion correction apparatus generates a first image $R_{ij}^m$ based on source images. The distortion correction apparatus may generate the first image $R_{ij}^m$ based on Equation 3 shown below.

$$R_{ij}^m = v_{ij}^a + v_{ij}^c \quad \text{[Equation 3]}$$

In Equation 3, m denotes a number of repetitions. Referring to Equation 3, the first image $R_{ij}^m$ may be determined based on an initial viewpoint number $v_{ij}^a$ and the compensation value $v_{ij}^c$. Because the compensation value $v_{ij}^c$ continues to be updated, the first image $R_{ij}^m$ may also continue to be updated until the compensation value $v_{ij}^c$ converges to a predetermined level, which will be further described below. As described above, the distortion correction apparatus may assign hue values to viewpoints.

In operation 430, the distortion correction apparatus generates a second image $C_{ij}^m$ based on an image acquired by capturing a display panel. The second $C_{ij}^m$ image may be an image obtained by converting the acquired image so as to correspond to the first image $R_{ij}^m$. For example, the distortion correction apparatus may cut or rotate the image acquired by capturing the display panel, in order to generate the second image $C_{ij}^m$. In operation 440, the distortion correction apparatus analyzes the second image $C_{ij}^m$. For example, when hue values are assigned to viewpoints and when various colors are included in the second image $C_{ij}^m$, the second image $C_{ij}^m$ may be determined to be distorted. The distortion correction apparatus may determine an appropriate compensation value $v_{ij}^c$ so that a single color may be included in the second image $C_{ij}^m$.

The distortion correction apparatus may determine a reference point in the second image $C_{ij}^m$. An image observed at the reference point may be referred to as a "reference source image." For example, the distortion correction apparatus may determine the compensation value $v_{ij}^c$ so that the reference source image may be displayed on an entire area of the second image $C_{ij}^m$. The reference point may be, for example, a central point of the second image $C_{ij}^m$ or a point that is perpendicularly oriented with respect to a camera that captures the display panel in the second image $C_{ij}^m$. When a hue value at the reference point is defined as $h_0^m$, a difference between the hue value $h_0^m$ and hue values of all the pixels of the second image $C_{ij}^m$ may be obtained by using Equation 4 shown below.

$$\Delta h_{ij}^m = h_0^m - h_{ij}^m \qquad \text{[Equation 4]}$$

In Equation 4, $h_{ij}^m$ denotes a hue value of a pixel that corresponds to an i-th row and j-th column, and $\Delta h_{ij}^m$ denotes a difference between the hue value $h_{ij}^m$ and the hue value $h_0^m$. Based on Equation 4, the compensation value $v_{ij}^c$ may be represented as expressed in Equation 5 below.

$$v_{ij}^c = \sum_{m=1}^{M} \left( \frac{\Delta h_{ij}^m}{360} N \right) \qquad \text{[Equation 5]}$$

In Equation 5, 360 denotes a range of hue values. The range of the hue values may be defined by another number, depending on exemplary embodiments.

In operation 450, the distortion correction apparatus updates the compensation value $v_{ij}^c$. In operation 460, the distortion correction apparatus determines whether the compensation value $v_{ij}^c$ converges. When the compensation value $v_{ij}^c$ does not converge, the distortion correction apparatus may repeat operation 420. When the number of repetition increases, hue values of the second image $C_{ij}^m$ may converge to the hue value $h_0^m$. When the compensation value $v_{ij}^c$ converges, the distortion correction apparatus may proceed to operation 470. When a variance of hue values is less than or equal to a predetermined threshold, the distortion correction apparatus may determine that the compensation value $v_{ij}^c$ converges. In operation 470, the distortion correction apparatus determines the compensation value $v_{ij}^c$ that converges. The compensation value $v_{ij}^c$ may be determined at a single point or at a plurality of points. The distortion correction apparatus may determine compensation values $v_{ij}^c$ for each of the plurality of points by performing operations 410 through 470 for each of the plurality of points.

Figure 5:
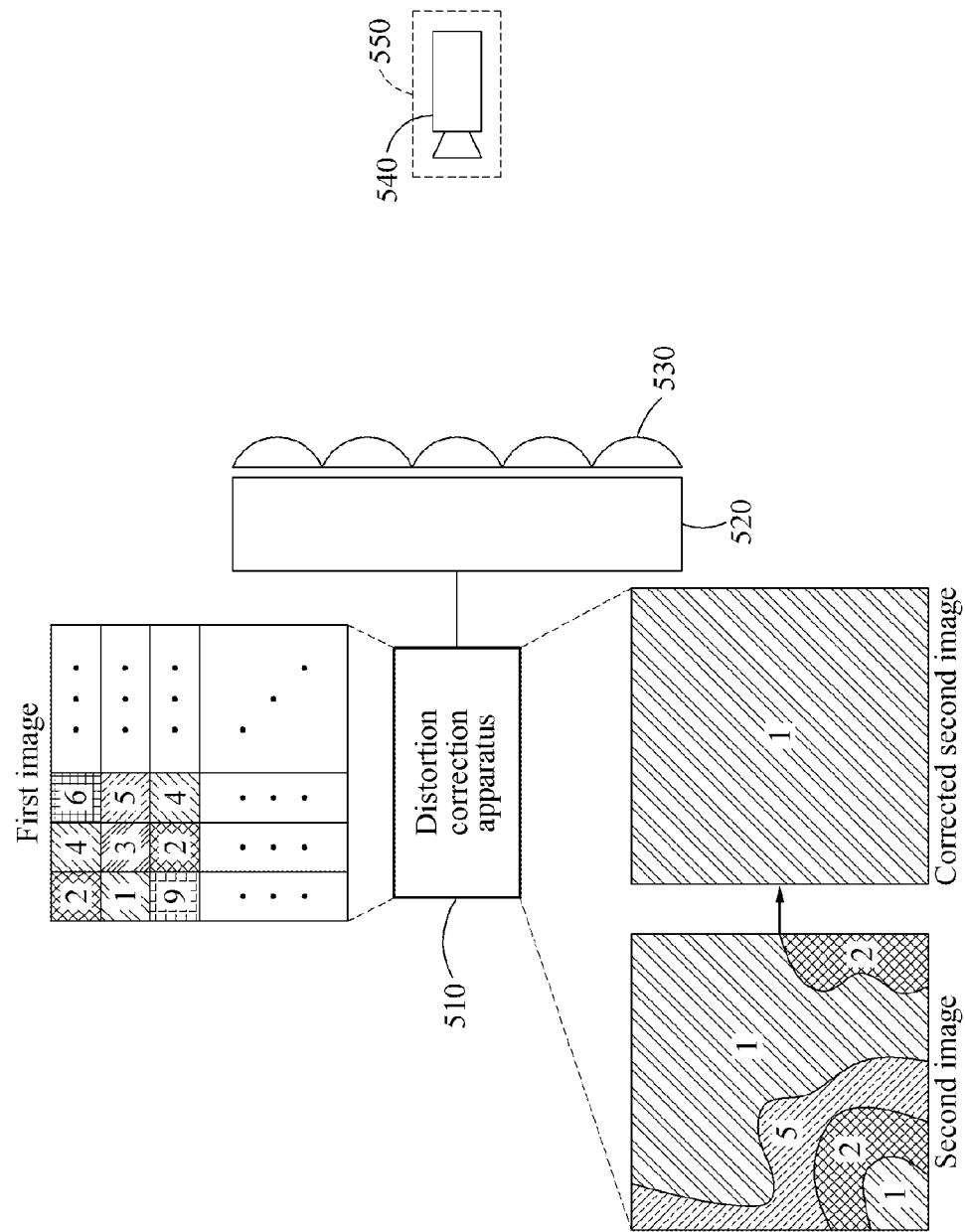
FIG. 5 is a diagram illustrating an example of a viewpoint compensation process based on a compensation value, according to an exemplary embodiment.

FIG. 5 is a diagram illustrating an example of a viewpoint compensation process based on a compensation value, according to an exemplary embodiment. Referring to FIG. 5, a distortion correction apparatus 510 may assign viewpoints to pixels of a display panel 520, and may display a first image on the display panel 520 based on source images that correspond to the pixels of the display panel 520. FIG. 5 illustrates source images that correspond to respective viewpoints of the display panel 520 and the viewpoints of the display panel 520 on the first image. Numbers of the first image may indicate the viewpoints assigned to the pixels, and patterns of the first image may indicate colors that correspond to the viewpoints.

The distortion correction apparatus 510 may output the first image via a 3D optical apparatus 530, and a camera 540 may capture the display panel 520 at a first point 550 while the first image is output via the 3D optical apparatus 530. For example, a source image that corresponds to a first viewpoint may be assumed to be observed at the first point 550 when there is no distortion. The distortion correction apparatus 510 may generate a second image based on an image acquired by the camera 540. The second image may include source images that correspond to viewpoints other than the first viewpoint. Accordingly, the second image may be determined to be distorted.

The distortion correction apparatus 510 may determine a compensation value based on a difference between the second image and the source image that corresponds to the first viewpoint. For example, the distortion correction apparatus 510 may determine the compensation value based on Equation 5 described above. The distortion correction apparatus 510 may update at least a portion of the viewpoints of the display panel 520 based on the compensation value. The distortion correction apparatus 510 may correct the second image by repeating the updating of the first image and updating of the compensation value based on the updated first image. When the distortion is corrected, the source image that corresponds to the first viewpoint may be observed from the corrected second image.

Figure 6:
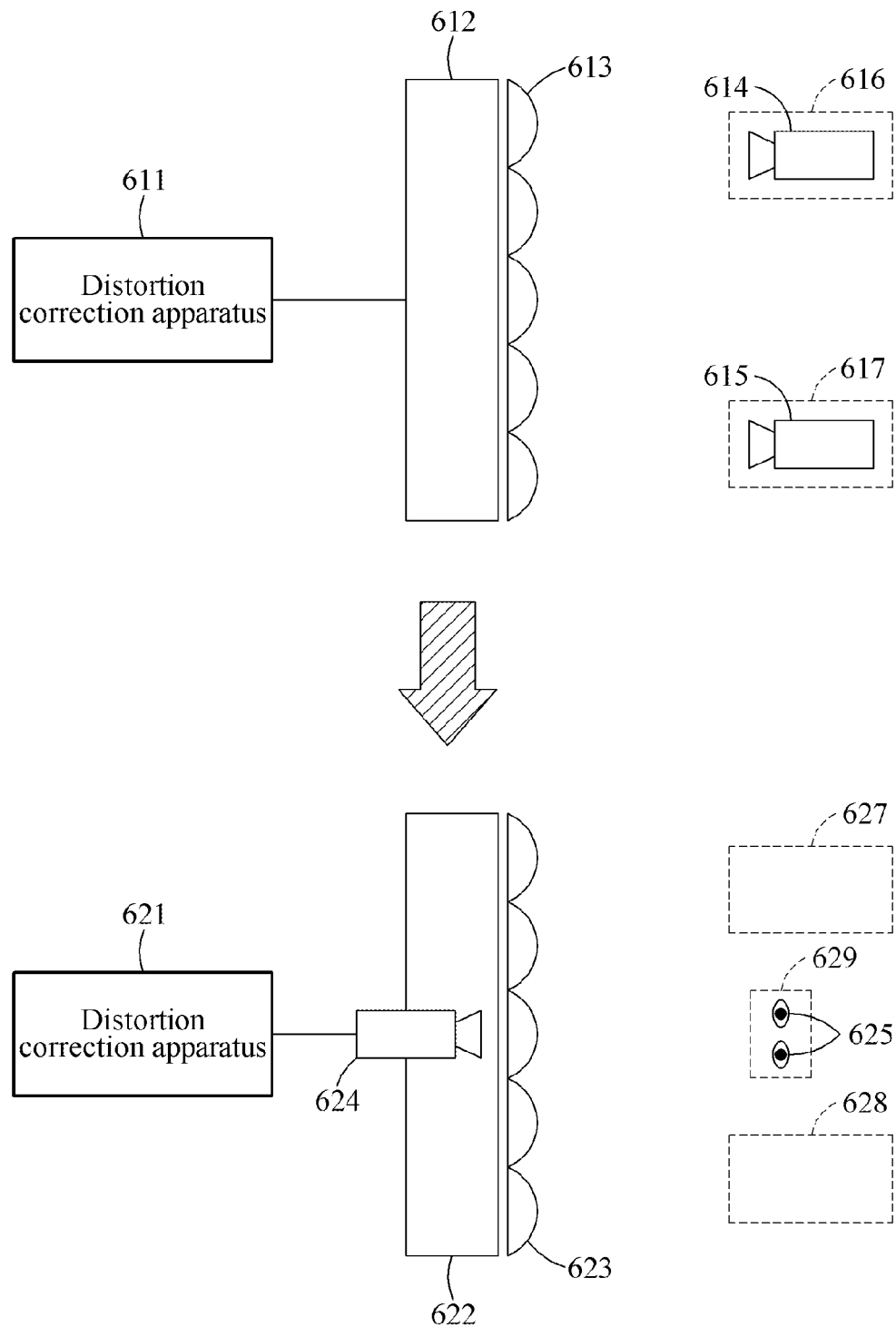
FIG. 6 is a diagram illustrating another example of a viewpoint compensation process based on a compensation value, according to an exemplary embodiment.

FIG. 6 is a diagram illustrating another example of a viewpoint compensation process based on a compensation value, according to an exemplary embodiment. A distortion correction apparatus 611 may assign viewpoints to pixels of a display panel 612, and may display a first image on the display panel 612 based on source images that correspond to the pixels of the display panel 612. The distortion correction apparatus 611 may output the first image via a 3D optical apparatus 613, and cameras 614 and 615 may capture the display panel 612 at a first point 616 and a second point 617 while the first image is output via the 3D optical apparatus 613. The distortion correction apparatus 611 may generate a second image and a third image based on images acquired by the cameras 614 and 615. For example, it may be assumed that when there is no distortion, a source image that corresponds to a first viewpoint is observed at the first point 616 and a source image that corresponds to a second viewpoint is observed at the second point 617. The distortion correction apparatus 611 may determine a first compensation value based on a difference between a second image and the source image that corresponds to the first viewpoint, and may determine a second compensation value based on a difference between a third image and the source image that corresponds to the second viewpoint. The distortion correction apparatus 611 may determine a compensation value based on Equation 5 as described above.

A distortion correction apparatus 621 may assign viewpoints to pixels of a display panel 622, and may display a first image on the display panel 622 based on source images that corresponds to the pixels of the display panel 622. The distortion correction apparatus 621 may output the first image via a 3D optical apparatus 623. The distortion correction apparatus 611, the display panel 612 and the 3D optical apparatus 613 may have the same configuration as the distortion correction apparatus 621, the display panel 622 and the 3D optical apparatus 623, respectively, although the distortion correction apparatus 611, the display panel 612 and the 3D optical apparatus 613 are separated from the distortion correction apparatus 621, the display panel 622 and the 3D optical apparatus 623 as shown in FIG. 6.

The distortion correction apparatus 621 may track a position of a user by using a camera 624. For example, it may be assumed that the user is located at a third point 629 and that a source image that corresponds to a third viewpoint is observed at the third point 629 when there is no distortion. The distortion correction apparatus 621 may determine a third compensation value that is usable to compensate for a distortion observed at the third point 629 based on the first compensation value and the second compensation value. A fourth point 627 may correspond to the first point 616 and a fifth point 628 may correspond to the second point 617. For example, when the user is located at the fourth point 627, the first compensation value may be applied to viewpoints of the display panel 622. When the user is located at the fifth point 628, the second compensation value may be applied to the viewpoints of the display panel 622. The distortion correction apparatus 621 may determine the third compensation value based on a distance between the fourth point 627 and the fifth point 628 and a difference between the first compensation value and the second compensation value. For example, the distortion correction apparatus 621 may determine the third compensation value based on a ratio between the distance between the fourth point 627 and the fifth point 628 and the difference between the first compensation value and the second compensation value.

The distortion correction apparatus 621 may update at least a portion of the viewpoints of the display panel 622 based on the third compensation value. The distortion correction apparatus 621 may correct the second image by repeating the updating of the third image and then updating of the compensation value based on the updated third image. The distortion is corrected, and the source image that corresponds to the third viewpoint may be observed from the corrected second image. In the example of FIG. 6, a distortion of an image associated with the third point 629 that is not determined in advance may be corrected. In addition, the distortion correction apparatus 510 of FIG. 5 does not have a relevance to parameters of the 3D optical apparatuses 613 and 623, and accordingly the example of FIG. 6 may be applicable to an example in which the 3D optical apparatuses 613 and 623 have atypical shapes.

Figure 7:
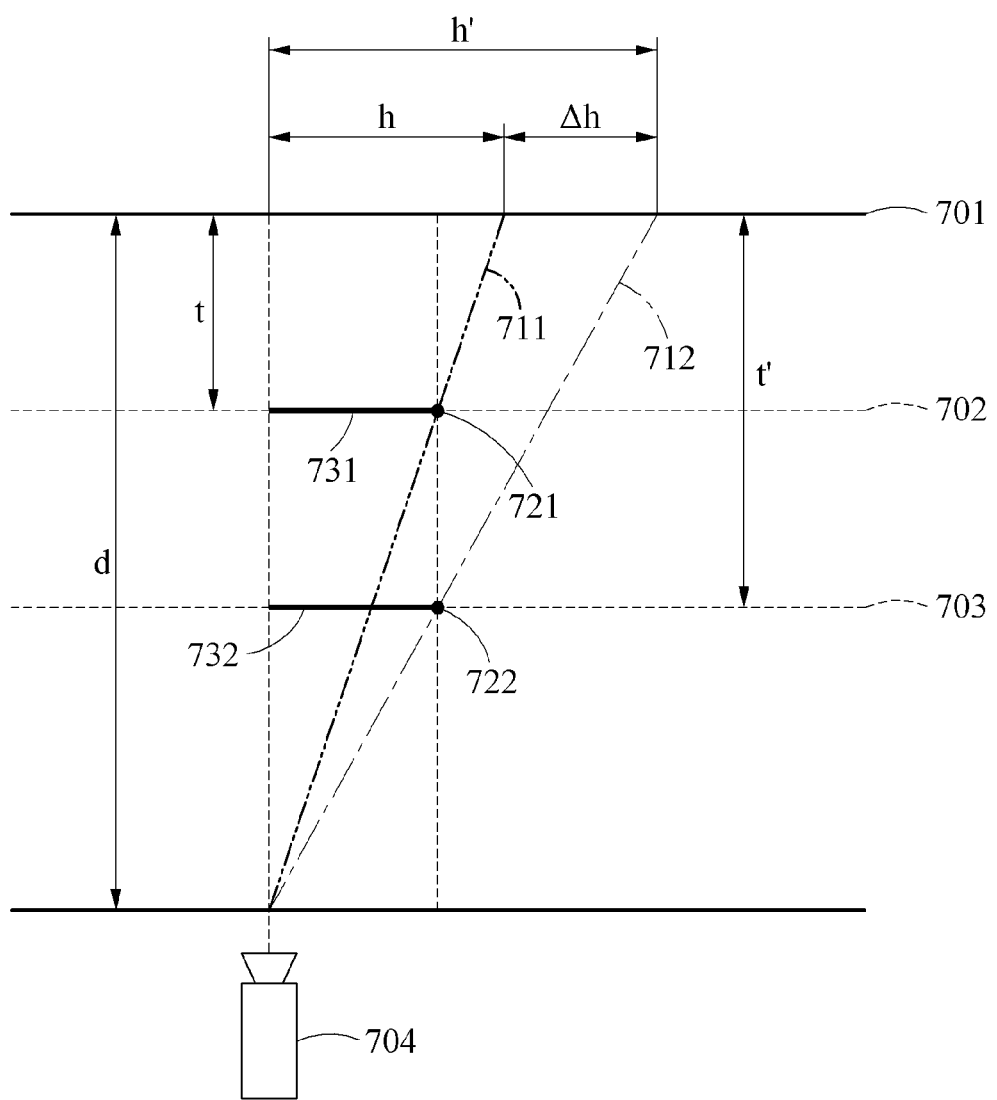
FIG. 7 is a diagram illustrating a process of estimating a gap, according to an exemplary embodiment.

FIG. 7 is a diagram illustrating a process of estimating a gap, according to an exemplary embodiment. Based on the above-described compensation value, a gap between a display panel and a 3D optical apparatus may be estimated. When the gap between the display panel and the 3D optical apparatus is not regular, an image may be distorted and fields of view (FOVs) may be different from each other for each of the pixels of the display panel. Accordingly, when a user is out of a position to which a compensation value is applied, an appropriate adjustment value may need to be applied to viewpoints of the pixels based on different FOVs.

FIG. 7 illustrates a display panel 701, a position 702 of a 3D optical apparatus in a design, and an estimated position 703 of the 3D optical apparatus. In FIG. 7, d denotes a distance between the display panel 701 and a camera 704, t denotes a gap in the design, h denotes a pitch in the design, h' denotes a pitch calculated based on a compensation value, and t' denotes an estimated gap. For example, when a central point of a slit barrier or a slanted lens is at a position 721, the camera 704 may show a pixel at a position 711. When the 3D optical apparatus is actually located at the position 703, the camera 704 may show a pixel at a position 712 away from the position 711 by Δh. In this example, the pixel at the position 711 may not be shown because the pixel is covered by a slit barrier or a slanted lens 732, and the pixel at the position 712 may pass through a position 722 that is a central point of the slit barrier or slanted lens. For example, when pitches, the sizes of the slit barrier or the slanted lens 731 and 732, of the 3D optical apparatus are assumed to have the same size, sizes of the pitches h and h' projected onto the display panel 701 may be proportional to the gaps t and t' between the display panel 701 and the 3D optical apparatus. The pitch h' may be obtained by using the following Equations:

$$g_{ij} = \frac{v^c_{i(j+1)} - v^c_{i(j-1)}}{2} \quad [\text{Equation 6}]$$

In Equation 6, $g_{ij}$ denotes a horizontal variation of a view difference. Based on the variation $g_{ij}$ and Equation 7, Δh may be obtained as shown in Equation 7 below.

$$\Delta h = \frac{g_{ij}}{360} h \quad [\text{Equation 7}]$$

In Equation 7, 360 denotes a range of hue values. As described above, a corresponding value may change based on a range of feature values of a used pattern. h may be obtained as shown in Equation 8 below.

$$h = p\cos\alpha \frac{d}{d-t} \quad [\text{Equation 8}]$$

In Equation 8, h denotes a horizontal size p cos α of a pitch projected onto the display panel 701 in a design of an optical apparatus, p denotes a pitch, d denotes a distance between the display panel 701 and the camera 704, and t denotes a gap between the display panel 701 and the 3D optical apparatus. When the gap t becomes closer to zero, h may have a value closer to p cos α. When the gap t increases, h may increase. Based on the above model, the gap t' may be estimated as expressed in Equation 9 below.

$$t' = d\left(1 - \frac{p\cos\alpha}{h + \Delta h}\right) \quad [\text{Equation 9}]$$

When the gap t' is obtained for all pixels of the display panel 701, a geometric model of the 3D optical apparatus may be determined based on the gap t'. In addition, FOVs of all the pixels of the display panel 701 may be determined based on the gap t' or the geometric model of the 3D optical apparatus, which will be further described with reference to FIG. 9 below.

Figure 8:
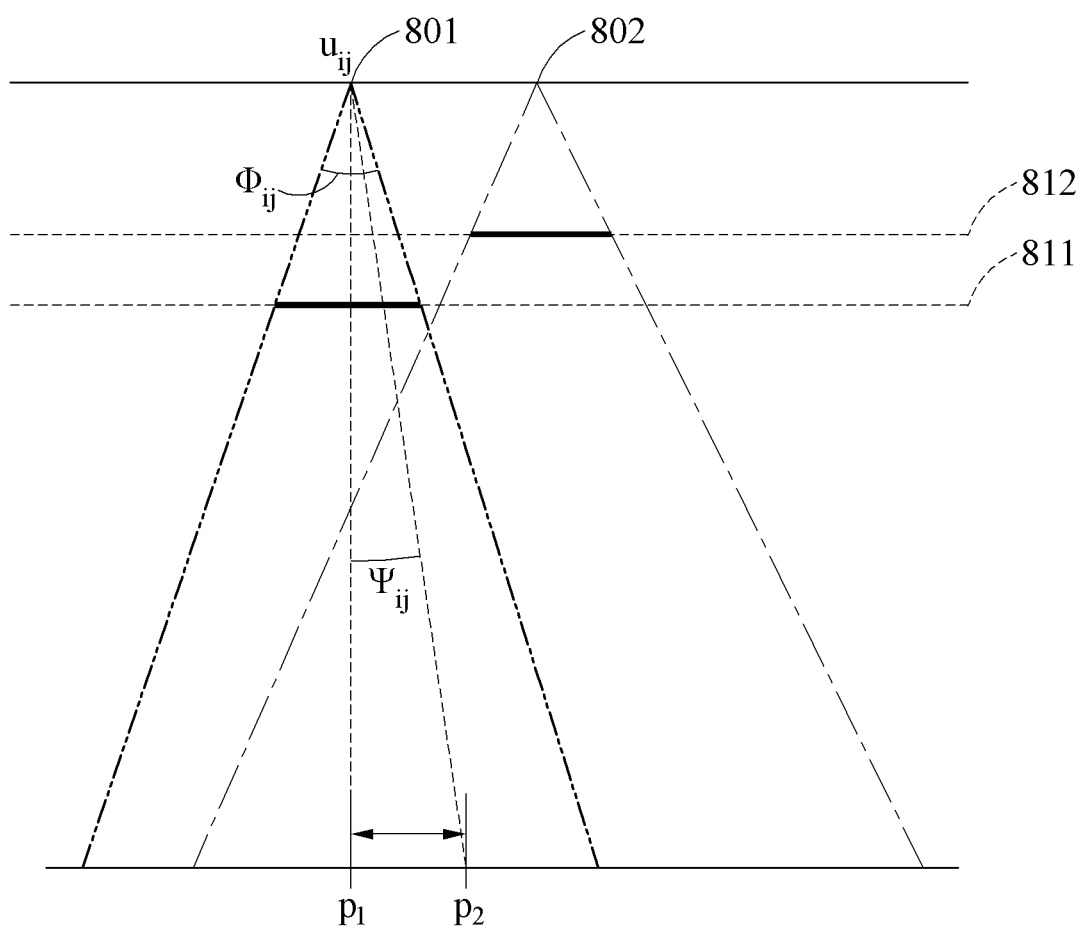
FIG. 8 is a diagram illustrating a process of determining an adjustment value, according to an exemplary embodiment.

FIG. 8 is a diagram illustrating a process of determining an adjustment value, according to an exemplary embodiment. FIG. 8 illustrates pixels 801 and 802 of a display panel, a position 811 of a 3D optical apparatus based on a gap t' estimated for the pixel 801, a position 812 of the 3D optical apparatus based on a gap t' estimated for the pixel 802, and a point $p_1$ at which the camera 704 of FIG. 7 is located to acquire an image for obtaining a view difference, and a point $p_2$ at which a user is located. When the gap t' estimated for the pixel 801 is greater than the gap t' estimated for the pixel 802 as shown in FIG. 8, an FOV of the pixel 802 may be greater than an FOV of the pixel 801. An FOV of a pixel $u_{ij}$ of the display panel may be obtained by using Equation 10 shown below.

$$\phi_{ij} = \tan^{-1}\left(\frac{p\cos\alpha}{2t'_{ij}}\right) \quad \text{[Equation 10]}$$

In Equation 10, $\phi_{ij}$ denotes the FOV of the pixel $u_{ij}$, $t_{ij}'$ denotes a gap for the pixel $u_{ij}$. An angle $\psi_{ij}$ between the point $p_1$, the pixel $u_{ij}$ and the point $p_2$ may be obtained by using Equation 11 shown below.

$$\psi_{ij} = \cos^{-1}\left(\frac{(p_1 - u_{ij}) \circ (p_2 - u_{ij})}{|p_1 - u_{ij}||p_2 - u_{ij}|}\right) \quad \text{[Equation 11]}$$

A variation in viewpoint numbers based on a movement of a position may be determined based on an FOV of a corresponding pixel. For the same movement distance, a variation in a viewpoint number of a pixel with a narrow FOV may increase, in comparison to a pixel with a wide FOV. Based on the variation in the viewpoint number, an adjustment value may be represented as expressed in Equation 12 below.

$$v_{ij}^w = \frac{\psi_{ij}}{\phi_{ij}} \quad \text{[Equation 12]}$$

In Equation 12, $v_{ij}^w$ denotes an adjustment value that corresponds to an i-th row and j-the column. Referring to Equation 12, the adjustment value $v_{ij}^w$ may be determined by a ratio between the FOV $\phi_{ij}$ and the angle $\psi_{ij}$. As described above, the distortion correction apparatus may generate an image that has a corrected distortion by assigning viewpoint numbers to all pixels of the display panel based on Equation 1. In the example of FIG. 8, the distortion correction apparatus may assign viewpoint numbers that correspond to the point $p_2$ to all the pixels of the display panel based on an initial viewpoint number, a compensation value obtained at the point $p_1$ and an adjustment value for the point $p_2$. The distortion correction apparatus may correct a distortion at the point $p_2$ based on a movement of the user in addition to the point p1 at which the compensation value is calculated by the adjustment value.

Figure 9:
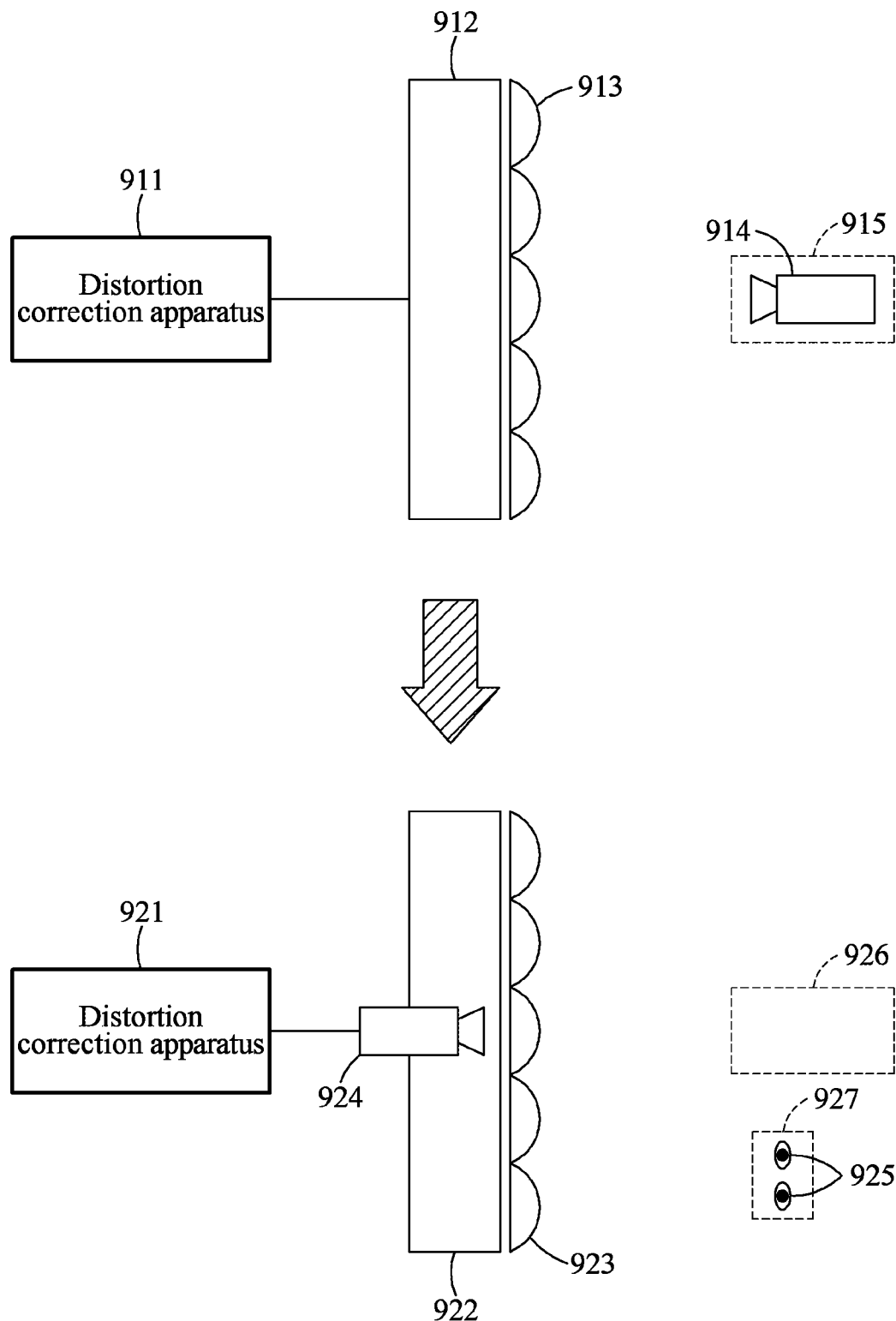
FIG. 9 is a diagram illustrating a viewpoint adjustment process based on an adjustment value, according to an exemplary embodiment.

FIG. 9 is a diagram illustrating a viewpoint adjustment process based on an adjustment value, according to an exemplary embodiment. Referring to FIG. 9, a distortion correction apparatus 911 may assign viewpoints to pixels of a display panel 912, and may display a first image on the display panel 912 based on source images that correspond to the pixels of the display panel 912. The distortion correction apparatus 911 may output the first image via a 3D optical apparatus 913. A camera 914 may capture the display panel 912 at a first point 915 while the first image is output via the 3D optical apparatus 913. The distortion correction apparatus 911 may generate a second image based on an image acquired by the camera 914. For example, it may be assumed that a source image that corresponds to a first viewpoint is observed at the first point 915 when there is no distortion. The distortion correction apparatus 911 may determine a first compensation value based on a difference between a second image and the source image that corresponds to the first viewpoint. The distortion correction apparatus 911 may determine a compensation value based on Equation 5 described above.

A distortion correction apparatus 921 may assign viewpoints to pixels of a display panel 922, and may display a first image on the display panel 922 based on source images that correspond to the pixels of the display panel 922. The distortion correction apparatus 921 may output the first image via a 3D optical apparatus 923. The distortion correction apparatus 911, the display panel 912 and the 3D optical apparatus 913 may have the same configuration as the distortion correction apparatus 921, the display panel 922 and the 3D optical apparatus 923, respectively, although the distortion correction apparatus 911, the display panel 912 and the 3D optical apparatus 913 are separated from the distortion correction apparatus 921, the display panel 922 and the 3D optical apparatus 923 as shown in FIG. 9.

The distortion correction apparatus 921 may track a position of a user by using a camera 924. For example, it may be assumed that the user is located at a second point 927 and that a source image that corresponds to a second viewpoint is observed at the second point 927 when there is no distortion. When viewpoints based on a compensation value that corresponds to the first point 915 is assigned to the pixels of the display panel 922, a distortion may be observed at the second point 927, because respective FOVs may be different from each other for each of the pixels, as described above. The distortion correction apparatus 921 may determine an adjustment value that corresponds to the second point 927 based on Equation 12. The distortion correction apparatus 921 may update at least a subset of the viewpoints of the display panel 922 by applying the compensation value that corresponds to the first point 915 and the adjustment value that corresponds to the second point 927 to Equation 1. The distortion correction apparatus 921 may correct a distortion at a point p2 based on a movement of a user in addition to a point 926 at which a compensation value is calculated by using an adjustment value in the second point 927 that corresponds to the movement of the user.

Figure 10:
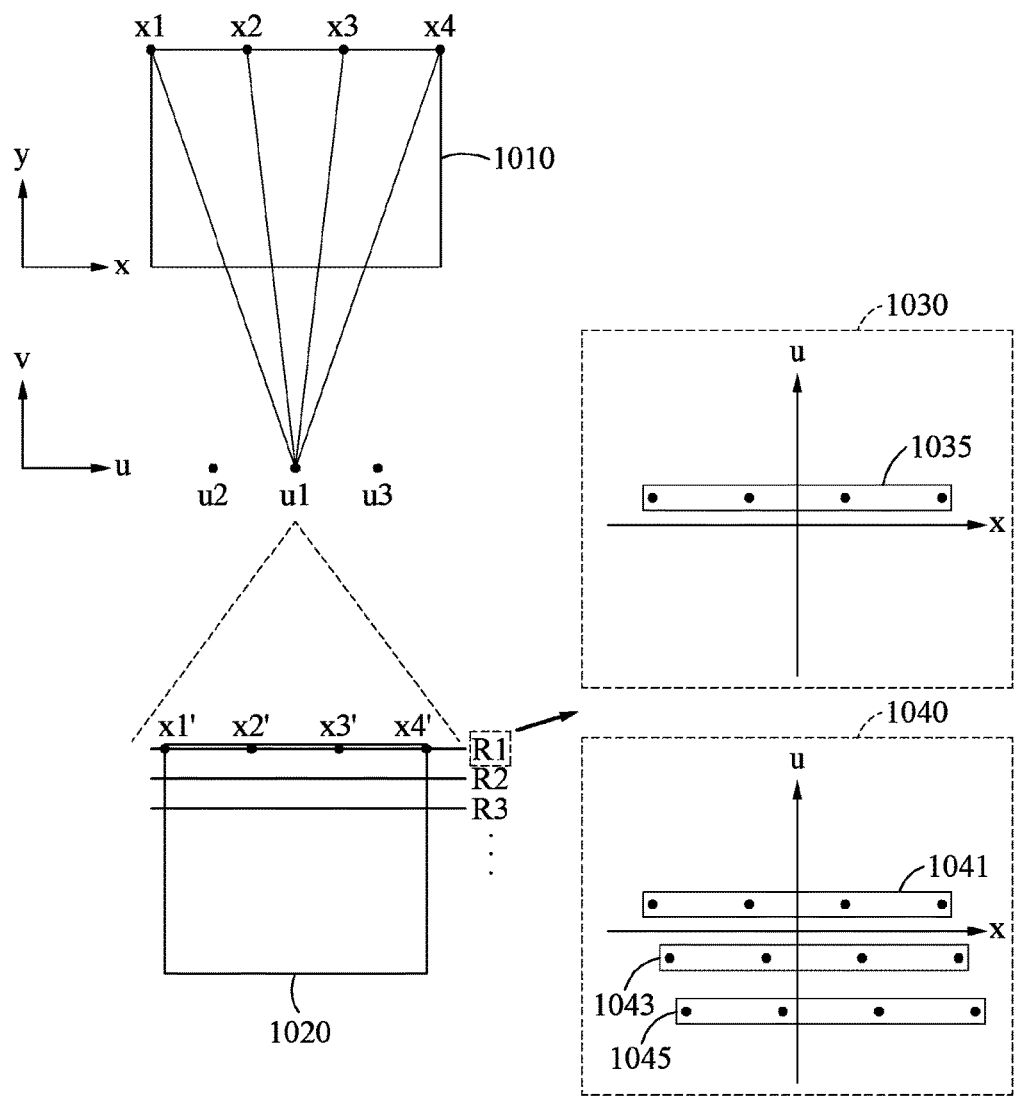
FIG. 10 is a diagram illustrating a process of determining corresponding points for visible pixels, according to an exemplary embodiment.

FIG. 10 is a diagram illustrating a process of determining corresponding points for visible pixels, according to an exemplary embodiment. Referring to FIG. 10, a distortion correction apparatus may assign viewpoints to pixels of a display panel 1010, and the display panel 1010 may display a first image based on source images that correspond to the assigned viewpoints. As described above, the source images may have respective feature values that correspond to viewpoint numbers. The distortion correction apparatus may generate second images based on images acquired by capturing the display panel 1010 at capturing points u1, u2 and u3 while the first image is output via a 3D optical apparatus. For example, the distortion correction apparatus may generate a second image 1020 based on an image acquired by capturing the display panel 1010 at the capturing point u1. The second image 1020 may be an image converted to correspond to the first image, and the distortion correction apparatus may cut or rotate the image, in order to generate the second image 1020.

The distortion correction apparatus may determine visible pixels for all rows of the second image 1020 and corresponding points for the visible pixel, and may determine visible pixel lines based on the determined corresponding points. Hereinafter, a process of determining visible pixel lines associated with a first row R1 of the second image 1020 will be described. Similarly to the visible pixel lines associated with the first row R1, visible pixel lines associated with a second row R2 and a third row R3 of the second image 1020 may be determined.

The first row R1 may include pixels x1', x2', x3' and x4' which respectively correspond to pixels x1, x2, x3 and x4 of the first image. The distortion correction apparatus may determine pixels of the display panel 1010 that correspond to the pixels x1, x2, x3 and x4 as visible pixels, based on a comparison between pixel values of the pixels x1, x2, x3 and x4 and pixel values of the pixels x1', x2', x3' and x4'. Pixel values of the first image may be determined based on feature values, and accordingly the distortion correction apparatus may compare feature values of the pixels x1, x2, x3 and x4 and feature values of the pixels x1', x2', x3' and x4'. The first image may be distorted due to an influence by the 3D optical apparatus when the first image is output, and accordingly a feature value of the pixel x1 may be different from a feature value of the pixel x1'. When a difference between the feature value of the pixel x1 and the feature value of the pixel x1' is within a predetermined range, the distortion correction apparatus may determine a pixel of the display panel 1010 that corresponds to the pixel x1 as a visible pixel. A process of determining visible pixels will be described below.

When the display panel 1010 is on an x-y plane and when a capturing point or a viewing position is on a u-v plane, a four-dimensional (4D) light field of (x, y, u, v) may be defined. In the 4D light field, when the x-axis and the u-axis that are horizontal axes are taken into consideration, light entering from x to u may be displayed as a single point on an x-u plane that is a 2D plane. In an example, when pixels of the display panel 1010 that correspond to the pixels x1, x2, x3 and x4 are determined as visible pixels that are observed at the capturing point u1, visible pixels of the display panel 1010 may be displayed as corresponding points 1035 on a 2D plane 1030. In another example, when the pixels of the display panel 1010 that correspond to the pixels x1, x2, x3 and x4 are determined as visible pixels that are observed at the capturing points u1, u2 and u3, visible pixels of the display panel 1010 may be displayed as corresponding points 1041, 1043 and 1045 on a 2D plane 1040.

The distortion correction apparatus may connect the corresponding points 1041, 1043 and 1045 and may determine visible pixel lines. The corresponding points 1041, 1043 and 1045 may indicate positions of visible pixels based on the capturing point u1. Accordingly, positions of visible pixels based on an arbitrary viewing position may be specified by visible pixel lines. The distortion correction apparatus may analyze positions of visible pixels observed at an arbitrary viewing position, and may assign a viewpoint that corresponds to the viewing position to the visible pixels. In an example other than the example of FIG. 10, at least three capturing points may be provided. In this example, a number of corresponding points may increase depending on a number of capturing points. As described above, the corresponding points 1041, 1043 and 1045 may be determined for the first row R1 of the second image 1020, and accordingly corresponding points may be determined for the other rows of the second image 1020.

FIG. 11 is a diagram illustrating a relationship between a gap and visible pixel lines, according to an exemplary embodiment. Referring to FIG. 11, a distortion correction apparatus may determine corresponding points for visible pixels on a 2D plane 1110, and may determine visible pixel lines by connecting the corresponding points. A 3D optical apparatus 1130 may include optical elements through which light of a limited direction propagates, for example, a slit of a parallax barrier or a curve of a lenticular lens. For example, light emitted from a display panel 1120 may reach a viewing position 1140 through the optical elements of the 3D optical apparatus 1130.

Δx denotes a change in a position of a pixel that emits light to an optical element 1135 on the display panel 1120, and Δu denotes a change in a position of a point at which light reaches from the optical element 1135 on the viewing position 1140. A slope of a visible pixel line may be determined based on Δx and Δu. The optical elements of the 3D optical apparatus 1130 may be distorted, for example, bent, and accordingly visible pixel lines may have different respective slopes for each of the optical elements.

In FIG. 11, t denotes a gap between the 3D optical apparatus 1130 and a viewing position 1140, and d denotes a distance between the display panel 1120 and the 3D optical apparatus 1130. A ratio between the gap t and the distance d may be equal to a ratio between the changes Δx and Δu. Accordingly, a slope a of a visible pixel line may be represented as expressed in Equation 13 below, and the gap t may be represented based on Equation 13 as expressed in Equation 14 below.

$$a = \frac{t}{d}$$ [Equation 13]

$$t = \frac{d\Delta u}{\Delta x}$$ [Equation 14]

Accordingly, the distortion correction apparatus may obtain the gap t based on the slope a and the distance d. Equation 14 may be associated with the optical element 1135, however, there is no limitation thereto. For example, the distortion correction apparatus may obtain a gap for the other optical elements using a similar scheme to the above-described scheme.

Figure 12:
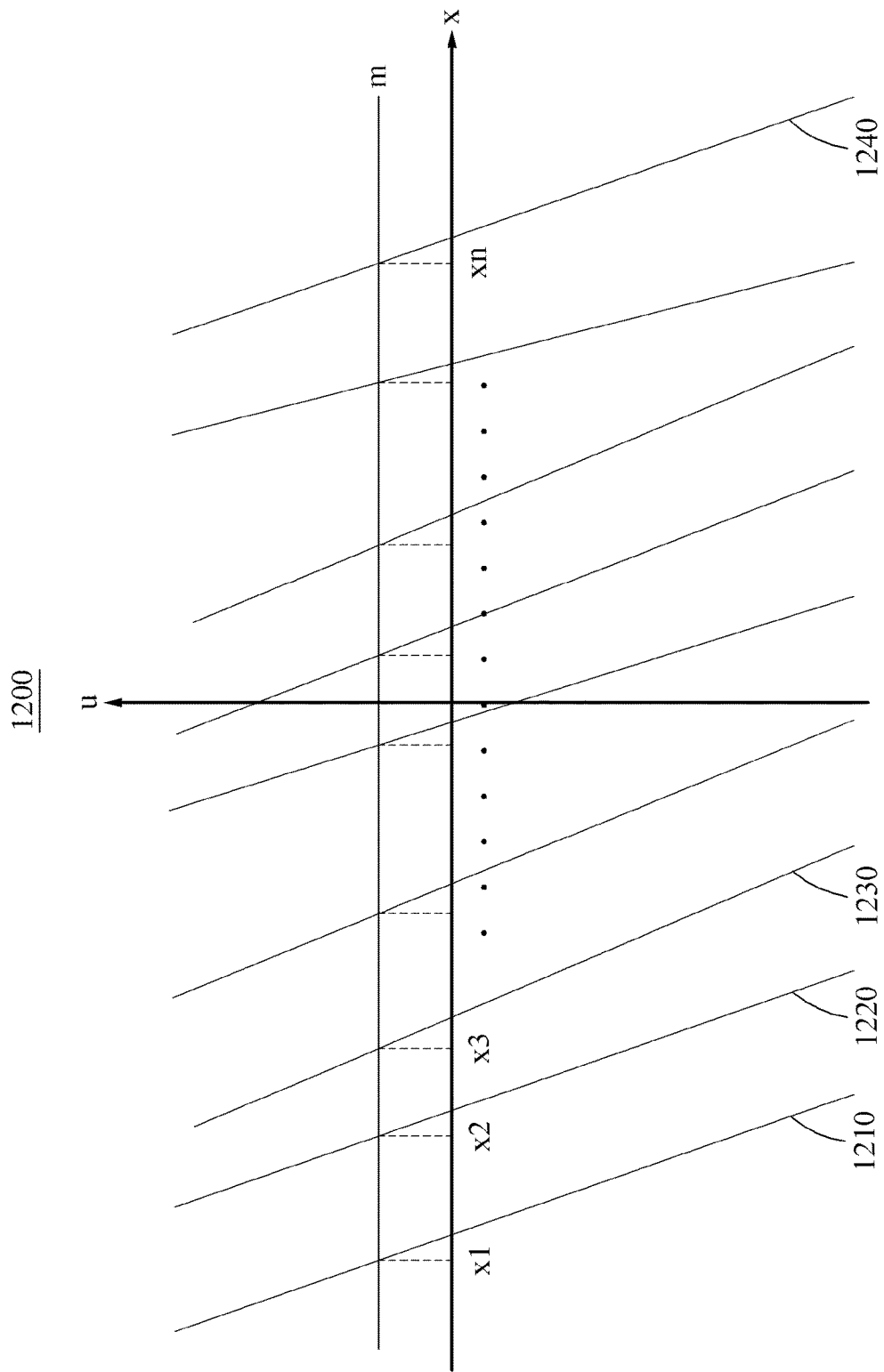
FIG. 12 is a diagram illustrating visible pixel lines and a line, according to an exemplary embodiment.

FIG. 12 is a diagram illustrating visible pixel lines and a line, according to an exemplary embodiment. A distortion correction apparatus may form visible pixel lines and may identify a visible pixel observed at a predetermined viewing position. For example, the distortion correction apparatus may determine intersection points between the visible pixel lines and a line m that corresponds to a viewing position U (not shown), and may determine pixels that correspond to the intersection points among pixels of a display panel as visible pixels observed at the viewing position U. The distortion correction apparatus may reassign a viewpoint that corresponds to the viewing position U to the pixels that correspond to the intersection points. For example, a first pixel of the display panel that corresponds to an x-coordinate x1 of an intersection point between the line m and a visible pixel line 1210 may be determined as a visible pixel observed at the viewing position U. Similarly, a second pixel, a third pixel and a fourth pixel of the display panel which respectively correspond to x-coordinates x2, x3 and xn of intersection points between the line m and visible pixel lines 1220, 1230 and 1240 may be determined as visible pixels observed at the viewing position U. Accordingly, the distortion correction apparatus may reassign the viewpoint that corresponds to the viewing position U to the first pixel through the fourth pixel.

Figure 13:
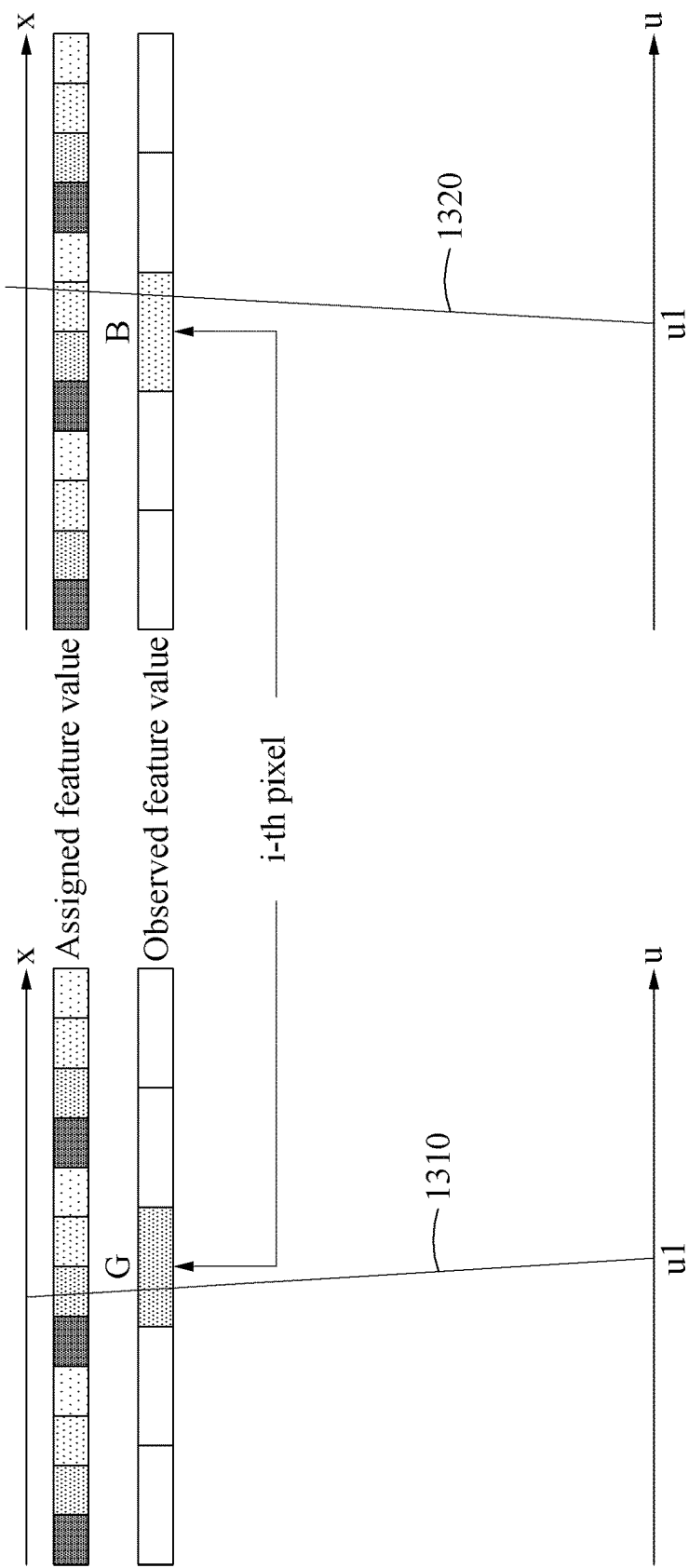
FIG. 13 is a diagram illustrating observation of feature values, according to an exemplary embodiment.

FIG. 13 is a diagram illustrating observation of feature values, according to an exemplary embodiment. A distortion correction apparatus may determine a visible pixel based on x-coordinates of a display panel. Because source images may have respective feature values that correspond to viewpoint numbers as described above, the distortion correction apparatus may determine x-coordinates based on feature values. For example, red that corresponds to a first viewpoint may be output from a first pixel of the display panel. The distortion correction apparatus may recognize coordinates of pixels of the display panel. For example, an x-coordinate of the first pixel may be x1. In this example, when red is observed at a second pixel of a second image, the distortion correction apparatus may determine the first pixel as a visible pixel and may determine an x-coordinate of a corresponding point for the visible pixel to be x1.

Despite the same pixels of the display panel, different x-coordinates may be determined based on feature values observed in the second image. The above difference may be caused by an offset of an optical element. For example, feature values based on hue values may be assigned to the pixels of the display panel, and an i-th pixel of the display panel may be observed at a capturing point u1. In an example, when green G is observed at the i-th pixel through a ray 1310, the distortion correction apparatus may determine a position of the i-th pixel based on an x-coordinate that corresponds to green G. In another example, when blue B is observed at the i-th pixel through a ray 1320, the distortion correction apparatus may determine a position of the i-th pixel based on an x-coordinate that corresponds to blue B.

Figure 14:
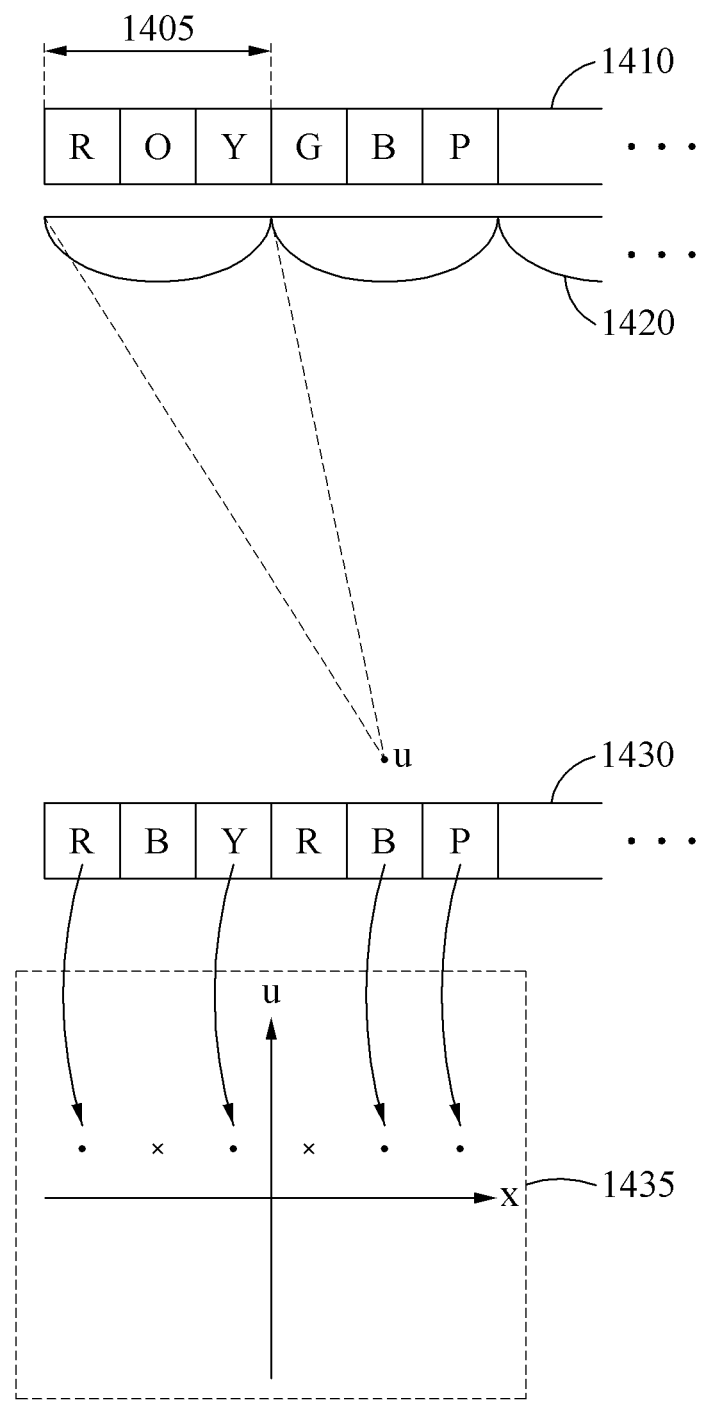
FIG. 14 is a diagram illustrating a process of determining a visible pixel, according to an exemplary embodiment.

FIG. 14 is a diagram illustrating a process of determining a visible pixel, according to an exemplary embodiment. As described above, while a first image displayed on a display panel is output via a 3D optical apparatus 1420, a distortion correction apparatus may generate a second image by capturing the display panel, and may determine a visible pixel based on pixel values of pixels included in the second image. For example, the 3D optical apparatus 1420 may interfere with light output from pixels of the display panel. Because the distortion correction apparatus may estimate a position of a visible pixel based on the pixel values of the pixels in the second image, an error may occur in the position of the visible pixel when an error is included in the pixel values. Accordingly, the distortion correction apparatus may determine the visible pixel by executing a verification of the pixel values of the pixels in the second image. For example, the distortion correction apparatus may compare a pixel value actually assigned to the display panel to a pixel value observed via the second image. In this example, when a difference between the pixel values is within a predetermined visible range, a pixel of the display panel as a visible pixel.

FIG. 14 illustrates a first row 1410 of the first image and a first row 1430 of the second image. The distortion correction apparatus may generate the second image by capturing the display panel at a capturing point u while the first image is output via the 3D optical apparatus 1420. A feature value of a first pixel included in the first row 1410 may be red R, and a feature value of a second pixel included in the first row 1410 may be orange O. Also, a feature value of a first pixel included in the first row 1430 may be red R, and a feature value of a second pixel included in the first row 1430 may be blue B. A visible range 1405 may be determined based on an optical element. For example, the visible range 1405 may be determined based on a width of a lens, because feature values by light output from pixels adjacent to a lens may be observed at the lens.

The feature value, that is, red R of the first pixel in the first row 1430, is within the visible range 1405 from the feature value of the first pixel in the first row 1410, and accordingly the distortion correction apparatus may determine a pixel of the display panel that corresponds to the first pixel in the first row 1410 as a visible pixel. In addition, the feature value, that is, blue B of the second pixel in the first row 1430, is out of the visible range 1405 from the feature value of the second pixel in the first row 1410, and accordingly the distortion correction apparatus may exclude a pixel of the display panel that corresponds to the second pixel in the first row 1410 from visible pixels. When visible pixels are determined as described above, the distortion correction apparatus may display corresponding points for the visible pixels on a 2D plane 1435.

Figure 15:
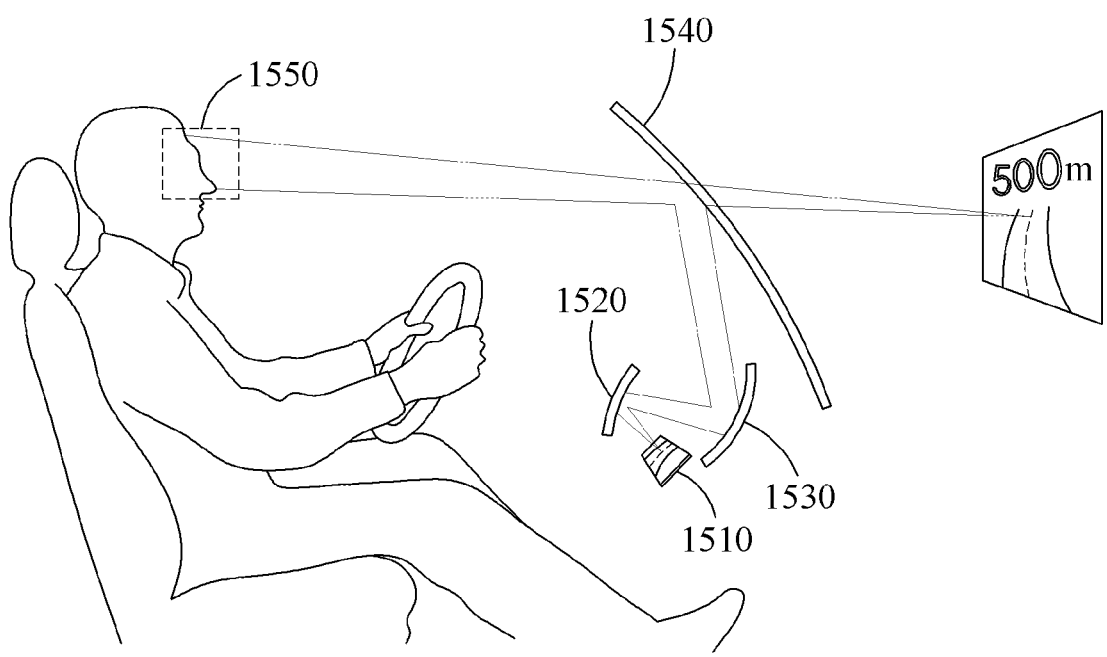
FIG. 15 is a diagram illustrating correction of a head-up display (HUD) image, according to an exemplary embodiment.

FIG. 15 is a diagram illustrating correction of a head-up display (HUD) image, according to an exemplary embodiment. FIG. 15 illustrates a glasses-free 3D display apparatus 1510, mirrors 1520 and 1530, and a glass 1540 (such as, for example, a windshield) of a vehicle. A user may observe an image displayed on the glasses-free 3D display apparatus 1510 through the glass 1540. Generally, the glass 1540 may have an atypical shape. Exemplary embodiments may be applicable to an atypical shape of a display, and accordingly may also be applicable to a HUD that uses the glass 1540. In an example, when a user is assumed to observe an image at a fixed point 1550, viewpoints of the 3D display apparatus 1510 may be determined based on a single compensation value that is calculated for the point 1550 in advance. In another example, when the user is assumed to observe an image at another point, a position of the user or a position of the eye of the user may be tracked, a compensation value that corresponds to the tracked position may be determined based on at least two compensation values calculated in advance, and viewpoints of the 3D display apparatus 1510 may be determined based on the determined compensation value.

Figure 16:
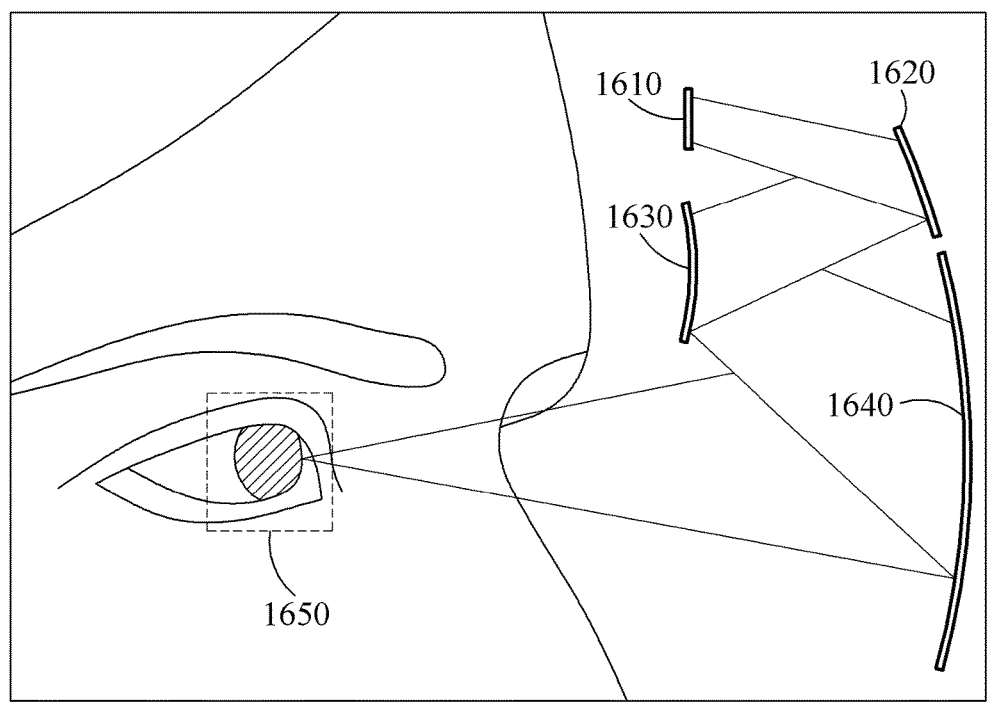
FIG. 16 is a diagram illustrating correction of an image of smart glasses, according to an exemplary embodiment.

FIG. 16 is a diagram illustrating correction of an image of smart glasses, according to an exemplary embodiment. FIG. 16 illustrates a glasses-free 3D display apparatus 1610, mirrors 1620 and 1630, and a lens 1640 of the smart glasses. A user may observe an image displayed on the glasses-free 3D display apparatus 1610 through the lens 1640. Generally, the lens 1640 may have an atypical shape. Exemplary embodiments may be applicable to an atypical shape of a display as described above, and accordingly may also be applicable to the lens 1640. In the same scheme as described in FIG. 15, when a user is assumed to observe an image at a fixed point 1650, viewpoints of the 3D display apparatus 1610 may be determined based on a single compensation value that is calculated for the point 1650 in advance. When the user is assumed to observe an image at another point, a position of the user or a position of the eye of the user may be tracked, a compensation value that corresponds to the tracked position may be determined based on at least two compensation values calculated in advance, and viewpoints of the 3D display apparatus 1610 may be determined based on the determined compensation values.

Figure 17:
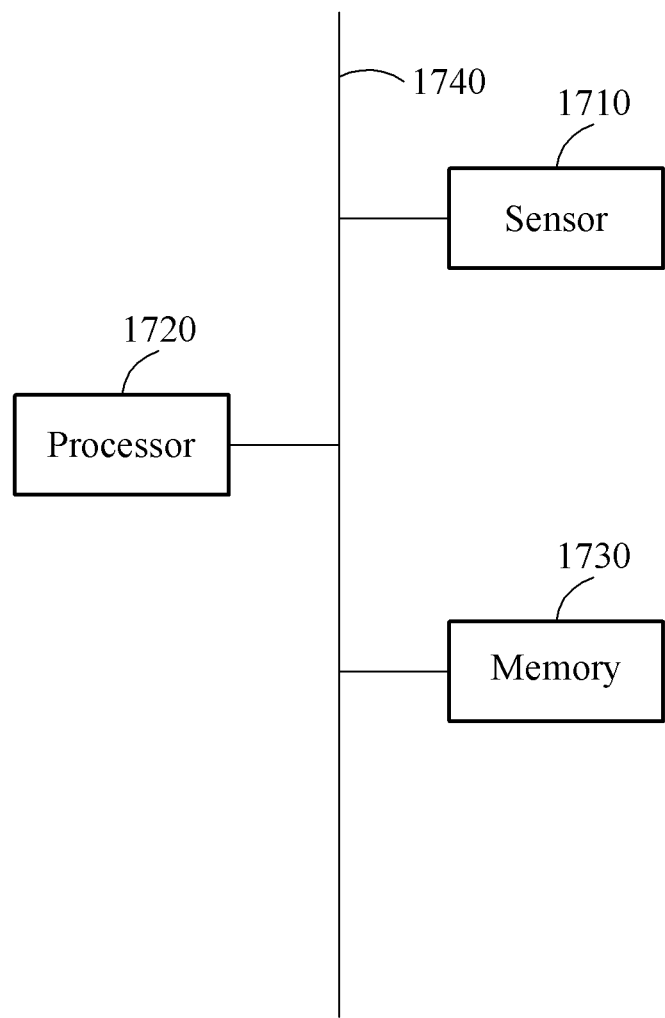
FIG. 17 is a block diagram illustrating a distortion correction apparatus, according to an exemplary embodiment.

FIG. 17 is a block diagram illustrating a distortion correction apparatus, according to an exemplary embodiment. Referring to FIG. 17, the distortion correction apparatus includes a sensor 1710, a processor 1720, and a memory 1730. The distortion correction apparatus may selectively include the sensor 1710. The sensor 1710, the processor 1720 and the memory 1730 may communicate via a bus 1740. The sensor 1710 may include, for example, an image sensor or a depth sensor configured to capture a display panel or track a position of a user. The sensor 1710 may correspond to at least one of the above-described cameras. The memory 1730 may include, for example, a nonvolatile memory such as a hard disk drive (HDD), a solid state drive (SSD) or a flash memory, or a volatile memory such as a dynamic random access memory (DRAM). The memory 1730 may be a cache memory in the processor 1720. The memory 1730 may include a computer-readable instruction. The instruction may be used to perform the above-described operations. For example, when the instruction is executed by the processor 1720, the processor 1720 may assign viewpoints to pixels of a display panel, may display a first image on the display panel based on source images that correspond to the viewpoints, may generate a second image based on an image acquired by capturing the display panel at a first point while the first image is output via a 3D optical apparatus, may determine a first compensation value that is usable to compensate for a distortion of the second image due to a geometric distortion between the display panel and the 3D optical apparatus, and may update at least one of the viewpoints based on the first compensation value. The above description is also applicable to the distortion correction apparatus, and accordingly is not repeated here.

Figure 18:
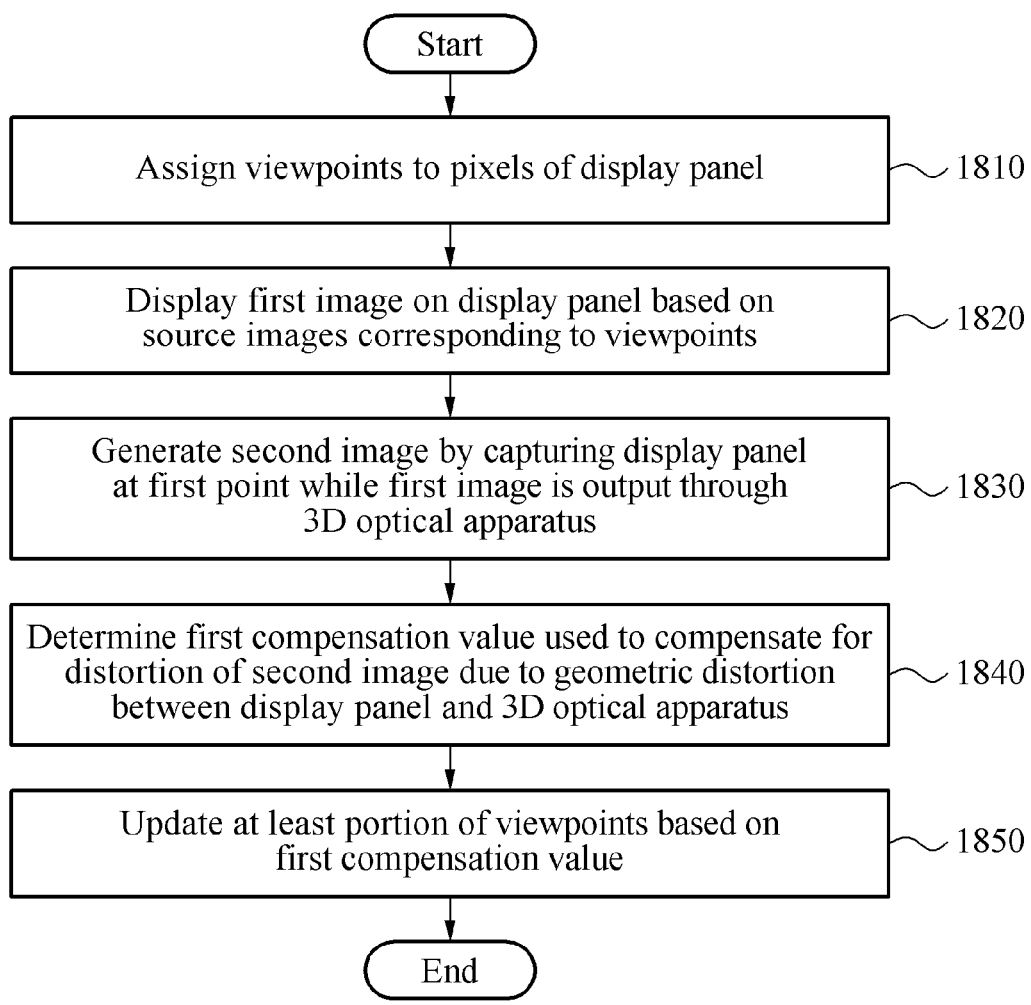
FIG. 18 is a flowchart illustrating an example of a distortion correction method, according to an exemplary embodiment.

FIG. 18 is a flowchart illustrating an example of a distortion correction method, according to an exemplary embodiment. Referring to FIG. 18, in operation 1810, a distortion correction apparatus may assign viewpoints to pixels of a display panel. In operation 1820, the distortion correction apparatus may display a first image on the display panel based on source images that correspond to the viewpoints. In operation 1830, the distortion correction apparatus may generate a second image based on an image acquired by capturing the display panel at a first point while the first image is output via a 3D optical apparatus. In operation 1840, the distortion correction apparatus may determine a first compensation value that is usable to compensate for a distortion of the second image due to a geometric distortion between the display panel and the 3D optical apparatus. In operation 1850, the distortion correction apparatus may update at least a subset of the viewpoints based on the first compensation value. The above description is also applicable to the distortion correction method, and accordingly is not repeated here.

FIG. 19 is a flowchart illustrating another example of a distortion correction method, according to an exemplary embodiment. Referring to FIG. 19, in operation 1910, a distortion correction apparatus may assign viewpoints to pixels of a display panel. In operation 1920, the distortion correction apparatus may display a first image on the display panel based on source images that correspond to the viewpoints. In operation 1930, the distortion correction apparatus may generate a second image and a third image based on images acquired by capturing the display panel at a first point and a second point while the first image is output via a 3D optical apparatus. In operation 1940, the distortion correction apparatus may determine a first compensation value that is usable to compensate for a distortion of the second image and a second compensation value that is usable to compensate for a distortion of the third image. In operation 1950, the distortion correction apparatus may determine a third compensation value based on the first compensation value and the second compensation value. The third compensation value may be used to compensate for a distortion observed at a third point. In operation 1960, the distortion correction apparatus may update at least a subset of the viewpoints based on the third compensation value. The above description is also applicable to the distortion correction method, and accordingly is not repeated here.

The exemplary embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, a person having ordinary skill in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in non-transitory computer-readable media that include program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as compact disk read-only memory (CD ROM) discs and digital versatile disks (DVDs); magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

While this disclosure includes exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the present disclosure.

What is claimed is:

1. A distortion correction method comprising:
   assigning viewpoints to pixels of a display panel;
   displaying a first image on the display panel based on source images that correspond to the viewpoints;
   generating a second image based on an image acquired by capturing the display panel at a first point while the first image is output via a three-dimensional (3D) optical apparatus;
   determining a reference source image observed at a reference point in the second image;
   determining a first compensation value based on a difference between a feature value of the reference source image and at least one feature value of a different source image, each of source images having a respective feature value that corresponds to a viewpoint number; and
   updating assignment of at least one of the viewpoints to at least one of the pixels based on the first compensation value.

2. The distortion correction method of claim 1, wherein the determining of the first compensation value further comprises determining the first compensation value based on a difference between the second image and a source image that corresponds to a viewpoint of the first point.

3. The distortion correction method of claim 1, wherein the determining of the first compensation value further comprises determining the first compensation value so that the reference source image is displayed on an entire area of the second image.

4. The distortion correction method of claim 1, wherein each of the source images has a respective feature value that is determined based on hue values that are at regular intervals or intensity values that are at regular intervals.

5. A distortion correction method comprising:
   assigning viewpoints to pixels of a display panel;
   displaying a first image on the display panel based on source images that correspond to the viewpoints;
   generating a second image based on an image acquired by capturing the display panel at a first point while the first image is output via a three-dimensional (3D) optical apparatus;
   determining a first compensation value that is usable to compensate for a distortion of the second image due to a geometric distortion between the display panel and the 3D optical apparatus;
   determining a second compensation value based on a third image generated by capturing the display panel at a second point, the second compensation value being usable to compensate for a distortion of the third image; and
   determining a third compensation value based on the first compensation value and the second compensation value, the third compensation value being usable to compensate for a distortion observed at a third point,
   updating assignment of at least one of the viewpoints to at least one of the pixels based on the third compensation value.

6. The distortion correction method of claim 5, wherein the third compensation value is determined based on a distance between the first point and the second point and a difference between the first compensation value and the second compensation value.

7. The distortion correction method of claim 5, further comprising:
   detecting an eye position of a user of the display panel; and
   determining the third point based on the detected eye position.

8. The distortion correction method of claim 5, wherein the determining of the first compensation value and the second compensation value comprises determining the first compensation value based on a difference between the second image and a source image that corresponds to a viewpoint of the first point.

9. The distortion correction method of claim 5, further comprising:
   determining a reference source image observed at a reference point in the second image,
   wherein the determining of the first compensation value and the second compensation value comprises determining the first compensation value so that the reference source image is displayed on an entire area of the second image.

10. The distortion correction method of claim 9, wherein each of the source images has a respective feature value that corresponds to a viewpoint number, and
    the determining of the first compensation value and the second compensation value comprises determining the first compensation value based on a difference between a feature value of the reference source image and at least one feature value of a different source image.

11. A distortion correction method comprising:
    assigning viewpoints to pixels of a display panel;
    displaying a first image on the display panel based on source images that correspond to the viewpoints;
    generating a second image based on an image acquired by capturing the display panel at a first point while the first image is output via a three-dimensional (3D) optical apparatus;
    determining a first compensation value that is usable to compensate for a distortion of the second image due to a geometric distortion between the display panel and the 3D optical apparatus;
    determining respective fields of view (FOVs) for each of the pixels based on a geometric model of the 3D optical apparatus;
    determining respective angles formed by the first point, each of the pixels, and a fourth point that is different from the first point;
    determining an adjustment value based on the determined FOVs and the determined angles, the adjustment value being usable to compensate for a distortion observed at the fourth point; and updating assignment of at least one of the viewpoints to at least one of the pixels based on the determined adjustment value.

12. The distortion correction method of claim 11, wherein the geometric model is determined based on a gap between the display panel and the 3D optical apparatus, and the gap is estimated based on the first compensation value.

13. The distortion correction method of claim 11, wherein the adjustment value is determined based on a ratio between the determined FOVs and the determined angles.

14. A non-transitory computer-readable storage medium storing a program executed by at least one processor to perform the method of claim 1.

* * * * *